(12) United States Patent
Kanai

(10) Patent No.: US 6,252,729 B1
(45) Date of Patent: Jun. 26, 2001

(54) REAL IMAGE TYPE FINDER OPTICAL SYSTEM

(75) Inventor: Moriyasu Kanai, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/450,414

(22) Filed: Nov. 30, 1999

(30) Foreign Application Priority Data

Dec. 3, 1998 (JP) .................................................. 10-344339

(51) Int. Cl.⁷ .............................. G03B 13/06; G02B 5/04
(52) U.S. Cl. .......................... 359/834; 359/362; 359/431; 359/836
(58) Field of Search ............................. 359/362, 420–423, 359/431–433, 399, 402, 407–409, 480–482, 831–837; 396/373–386

(56) References Cited

U.S. PATENT DOCUMENTS

| 2,058,676 | * | 10/1936 | Foster | 359/431 |
| 2,456,521 | * | 12/1948 | Maxwell | 359/431 |
| 3,879,105 | * | 4/1975 | Broche et al. | 359/431 |
| 4,652,094 | * | 3/1987 | Kitajima | 359/835 |
| 5,091,739 | * | 2/1992 | Kawamura | 359/431 |
| 5,231,534 | * | 7/1993 | Kato | 359/431 |
| 5,640,632 | | 6/1997 | Koyama et al. | 396/382 |
| 5,754,336 | | 5/1998 | Kanai | 359/431 |
| 5,801,882 | * | 9/1998 | Miyauchi | 359/431 |

FOREIGN PATENT DOCUMENTS

| 6-167739 | 6/1994 | (JP) . |
| 10-282422 | 10/1998 | (JP) . |

* cited by examiner

*Primary Examiner*—Thong Nguyen
(74) *Attorney, Agent, or Firm*—Greenblum & Bernstein, P.L.C.

(57) ABSTRACT

A real image type finder optical system includes, in order from the object side, an objective optical system, a first prism, a second prism, and an eyepiece lens. The first prism includes a first face as an entrance surface confronting the exit plane of the objective optical system, a second face making an angle of 22.5° with respect to this first face and a third face for transmitting the finder optical axis bent in order by the second face and the first face. The second prism includes a first face as an entrance surface confronting the third face of the first prism with a space therebetween, a second face opposed to the first face so as to bend the finder optical axis toward the object side within a horizontal plane, a third face for turning the finder optical axis bent in order by the second face and the first face to a direction generally coaxial with the eyepiece lens and a fourth face for transmitting the optical axis turned from the third face. The eyepiece lens confronts the fourth face of the second prism so as to be generally coaxial with the finder optical axis passing through the second prism.

5 Claims, 12 Drawing Sheets

REAL IMAGE TYPE FINDER OPTICAL SYSTEM

BACKGROUND OF THE INVENTION

1. Field of the Invention

The present invention relates to a real image type finder optical system for use in a viewfinder of cameras. The present disclosure relates to subject matter contained in Japanese Patent Application No. Hei 10-344339 (filed on Dec. 3, 1998), which is expressly incorporated herein by reference in its entirety.

2. Description of the Related Art

As shown in the plan view of FIG. 12, in a conventional real image type finder optical system for use in compact cameras and the like, light beams from an object are transmitted through an objective optical system 100 to be converged, reflected 90° laterally by a roof mirror 101 while being inverted upside down along the vertical direction that is perpendicular to the plane of FIG. 12, and forms an erected image of an object on the plane of a condenser lens 102 once. The light beams having formed the erected image of the object enter a penta prism 103 while being diverged. The light beams are reflected twice, each by 45°, within the plane including optical axes of the objective optical system 100 and the condenser lens 102 in the pentagonal prism 103 and thereafter exit the penta prism 103 in parallel to the optical axis of the objective optical system 100. The light beams coming out of the penta prism 103 are transmitted through an eyepiece lens 104 to form the virtual image of the object which is observed by a photographer. Incidentally, the cover glass 105 in FIG. 12 is a plane parallel plate fit into the camera casing.

Since its optical axis extending from the objective lens 100 to the eyepiece lens 104 (hereinafter, referred to as "finder optical axis") is bent only within the same plane, a conventional real image type finder optical system having such configuration as described above may be small in vertical dimension as compared with ones using a Porro prism.

Now, for the purpose of making a diopter adjustment in conformity to the photographer's vision possible, it is desirable to design the eyepiece lens 104 so as to be movable along the direction of the finder optical axis. Therefore, a moving range α of the eyepiece lens 104 must be provided behind the exit surface 103a of the penta prism 103.

According to the conventional real image type finder optical system shown in FIG. 12, however, the entire finder optical path extending from the objective optical system 100 to the fore-end of the moving range α of the eyepiece lens 104 (that is, the exit surface 103a of the penta prism 103) lies before (above, in FIG. 12) the fore-end of the moving range α of the eyepiece lens 104 (that is, the exit surface 103a of the penta prism 103). This means that the moving range α of the eyepiece lens 104 can not overlap with the finder optical path extending from the objective optical system 100 to the fore-end of the moving range α of the eyepiece lens 104 (that is, the exit surface 103a of the penta prism 103) in the front-to-back direction (the top-to-bottom direction in FIG. 12). Consequently, conventional real image type finder optical systems cannot be constituted very compact in overall length along the front-to-back direction, and the cover glass 105 needs to be projected from the camera casing.

SUMMARY OF THE INVENTION

In view of the above-described problems in conventional real image type finder optical systems, it is an object of the present invention to provide a real image type finder optical system in which the moving range of the eyepiece lens overlaps with the optical path extending from the objective optical system to the fore-end of the moving range of the eyepiece lens in the front-to-back direction to reduce the overall length of the system along the front-to-back direction.

A real image type finder optical system according to a first aspect of the present invention contrived to attain the foregoing object has an objective optical system and an eyepiece lens arranged so that their optical axes are parallel to each other. In the real image type finder optical system, an optical axis extending from the objective optical system to the eyepiece lens is bent at least two times in parallel with a prescribed plane. This real image type finder optical system comprises a first prism which has a first face as an entrance surface confronting an exit plane of the objective optical system, a second face opposed aslope to the first face in order to obliquely bend the optical axis of the objective optical system toward the first face and a third face as an exit surface for transmitting the optical axis bent in order by the second face and the first face. The finder optical system further comprises a second prism which has a first face as an entrance surface for transmitting the optical axis transmitted through the first prism, a second face opposed aslope to the first face in order to obliquely bend the optical axis to an object side and toward the first face, a third face for further bending the optical axis bent in order by the second face and the first face so as to be substantially coaxial with that of the eyepiece lens and a fourth face as an exit surface for transmitting the optical axis bent by the third face.

In such constitution, the fourth face of the second prism may be located on an objective side of the eyepiece-side margin of the optical path extending from the first face to the second face of the second prism, in the front-to-back direction. Meanwhile, the moving range of the eyepiece lens is provided along the finder optical axis extending in the front-to-back direction. Therefore, the optical path from the objective optical system to the fore-end of the moving range of the eyepiece lens may overlap with the moving range of the eyepiece lens in the front-to-back direction. As a result, the real image type finder optical system according to the present invention can be reduced in overall length along the front-to-back direction.

A real image type finder optical system according to a second aspect of the present invention has an objective optical system and an eyepiece lens arranged so that their optical axes are parallel to each other. In the real image type finder optical system, an optical axis extending from the objective optical system to the eyepiece lens is bent at least two times in parallel with a prescribed plane. This real image type finder optical system comprises a first prism which has a first face as an entrance surface confronting an exit plane of the objective optical system, a second face opposed aslope to the first face in order to obliquely bend the optical axis of the objective optical system toward the first face and a third face as an exit surface for transmitting the optical axis bent in order by the second face and the first face. The finder optical system further comprises a second prism which has a first face as an entrance surface for transmitting the optical axis transmitted through the first prism, a second face opposed aslope to the first face in order to obliquely bend the optical axis to an object side and toward the first face and a third face as an exit surface for transmitting the optical axis bent in order by the second face and the first face. The finder optical system further comprises a reflecting member which has a reflective surface for bending the optical axis transmitted through the second prism so as to be substantially coaxial with that of the eyepiece lens.

In such constitution, the reflective surface of the reflecting member may be located on an objective side of the eyepiece-side margin of the optical path extending from the first face to the second face of the second prism, in the front-to-back direction. Meanwhile, the moving range of the eyepiece lens is provided along the finder optical axis extending in the front-to-back direction, or along the finder optical axis extending from the third face of the second prism toward the reflecting member. Therefore, the optical path from the objective optical system to the fore-end of the moving range of the eyepiece lens may overlap with the moving range of the eyepiece lens in the front-to-back direction. Consequently, the real image type finder optical system according to the present invention can be reduced in overall length along the front-to-back direction.

A real image type finder optical system according to a third aspect of the present invention has an objective optical system and an eyepiece lens arranged so that their optical axes are parallel to each other. In the real image type finder optical system, an optical axis extending from the objective optical system to the eyepiece lens is bent at least two times in parallel with a prescribed plane. This real image type finder optical system comprises a first prism which has a first face as an entrance surface for transmitting the optical axis of the objective optical system, a second face for bending the optical axis laterally and a third face inclined with respect to the first face in order to bend the optical axis bent by the second face to a direction substantially perpendicular to the second face. The finder optical system further comprises a second prism which has a first face as an entrance surface for transmitting the optical axis transmitted through the first prism, a second face opposed aslope to the first face in order to obliquely bend the optical axis to an object side and toward the first face, a third face for further bending the optical axis bent in order by the second face and the first face so as to be generally coaxial with the eyepiece lens and a fourth face as an exit surface for transmitting the optical axis bent by the third face.

In such constitution, the fourth face of the second prism may be located on an objective side of the eyepiece-side margin of the optical path extending from the first face to the second face of the second prism, in the front-to-back direction. Meanwhile, the moving range of the eyepiece lens is provided along the finder optical axis extending in the front-to-back direction. Therefore, the optical path from the objective optical system to the fore-end of the moving range of the eyepiece lens may overlap with the moving range of the eyepiece lens in the front-to-back direction. Consequently, the real image type finder optical system according to the present invention can be reduced in overall length along the front-to-back direction.

A real image type finder optical system according to a fourth aspect of the present invention has an objective optical system and an eyepiece lens arranged so that their optical axes are parallel to each other. In the real image type finder optical system, an optical axis extending from the objective optical system to the eyepiece lens is bent at least two times in parallel with a prescribed plane. This real image type finder optical system comprises a first prism which has a first face as an entrance surface for transmitting the optical axis of the objective optical system, a second face for bending the optical axis laterally and a third face inclined with respect to the first face in order to bend the optical axis bent by the second face to a direction substantially perpendicular to the second face. The finder optical system further comprises a second prism which has a first face as an entrance surface for transmitting the optical axis transmitted through the first prism, a second face opposed aslope to the first face in order to obliquely bend the optical axis to an object side and toward the first face and a third face as an exit surface for transmitting the optical axis bent in order by the second face and the first face. The finder optical system further comprises a reflecting member which has a reflective surface for bending the optical axis transmitted through the second prism so as to be substantially coaxial with that of the eyepiece lens.

In such constitution, the reflective surface of the reflecting member may be located nearer to the objective optical system than the eyepiece-side margin of the optical path extending from the first face to the second face of the second prism, in the front-to-back direction. Meanwhile, the moving range of the eyepiece lens is provided along the finder optical axis extending in the front-to-back direction, or along the finder optical axis extending from the third face of the second prism toward the reflecting member. Therefore, the optical path from the objective optical system to the fore-end of the moving range of the eyepiece lens may overlap with the moving range of the eyepiece lens in the front-to-back direction. Consequently, the real image type finder optical system according to the present invention can be reduced in overall length along the front-to-back direction.

BRIEF EXPLANATION OF THE DRAWINGS

The invention will be described below in detail with reference to the accompanying drawings, in which.

DETAILED DESCRIPTION OF THE PREFERRED EMBODIMENTS

Hereinafter, embodiments of the present invention will be described in conjunction with the accompanying drawings.

First Embodiment

Figure 1:
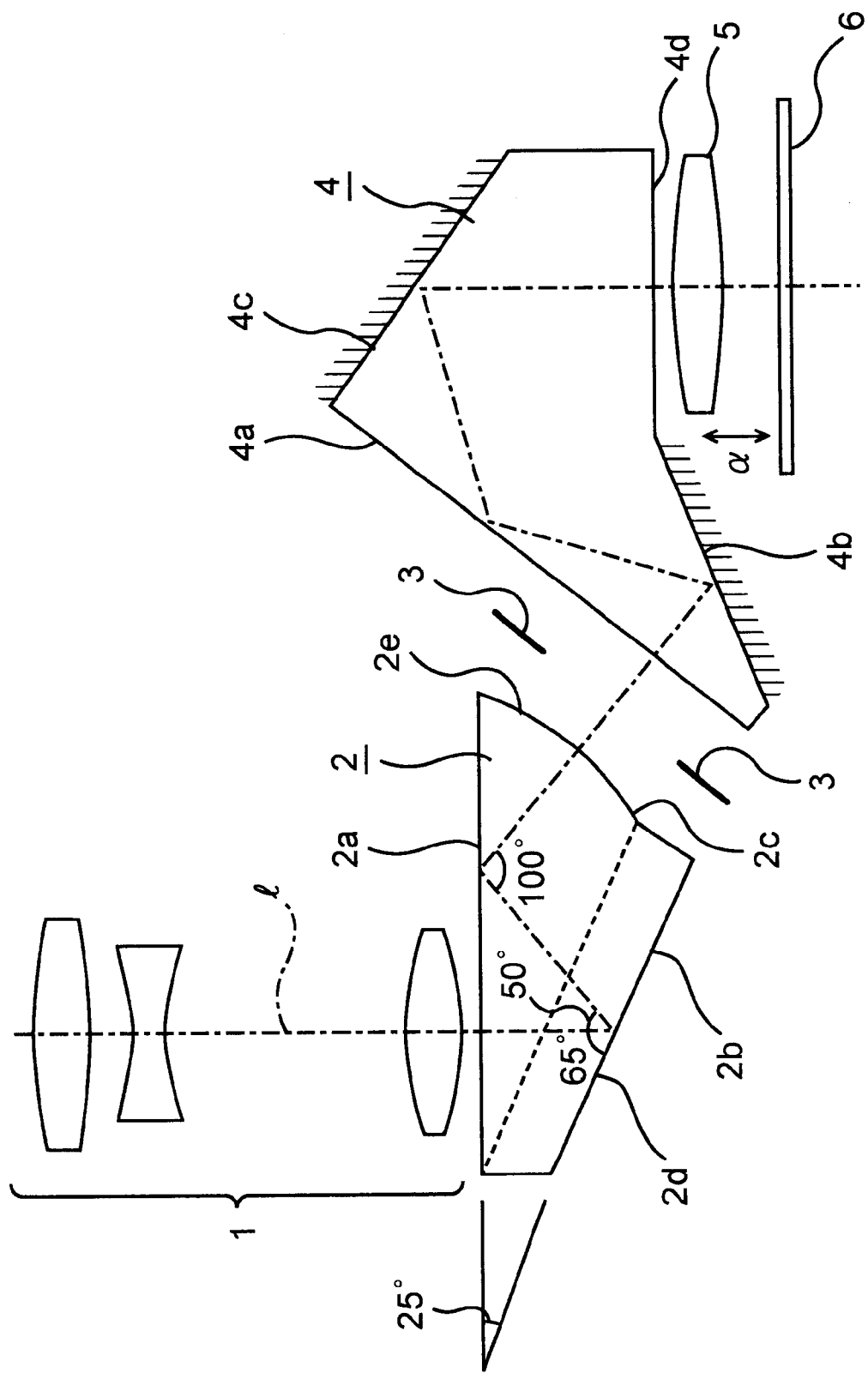
FIG. 1 is a plan view of the real image type finder optical system according to a first embodiment of the present invention.

FIG. 1 is a plan view of the real image type finder optical system according to a first embodiment of the present invention. The top-to-bottom direction in the figure corresponds to the front-to-back direction of this real image type finder optical system, in other words, the direction connecting an object and a photographer's eye.

As shown in FIG. 1, the real image type finder optical system according to the first embodiment comprises, in order from the object side along an optical path, an objective optical system 1, a first prism 2, a field frame 3, a second prism 4, an eyepiece lens 5 and a cover glass 6. An initial optical axis of the objective optical system 1 and an initial optical axis of the eyepiece lens 5 are in parallel with each other. In this connection, the optical axis extending from the objective optical system 1 and being bent in the finder optical system so as to be coaxial with the eyepiece lens 5 is hereinafter referred to as finder optical axis 1.

The objective optical system 1 is a zoom lens composed of three groups of lens, and forms a real image of an object (not shown) as an aerial image in the vicinity of the finder optical axis 1 (more specifically, on the plane bordered by the field frame 3) between the first prism 2 and the second prism 4 at a magnification corresponding to the overall focal length of the objective optical system. This objective optical system 1 is constituted as a non-telecentric system in order to avoid its diameter becoming large.

The first prism 2 has side faces including a first face 2a as an entrance surface, a second face 2b, and a third face 2c as an exit surface. The first face 2a is arranged to confront the objective optical system 1 and to be substantially perpendicular to the finder optical axis 1. The second face 2b is consisted of roof faces comprising a pair of reflective faces which meet each other with a right angle therebetween along a ridge line 2d inclined by 25° with respect to the first face 2a within a plane of FIG. 1. The third face 2c adjoins the first face 2a on the side where the first face 2a and the second face 2b draw apart from each other. This first prism 2 is molded of transparent resin having a refractive index of 1.5. Therefore, the total reflection condition of the first prism 2 for its internal reflection is that a critical angle θ is 41.8° (=sin$^{-1}$ 1/1.5). The first prism 2, being a resinous article, can be obtained at lower costs.

The ridge line 2d of the roof faces constituting the second face 2b of this first prism 2 inclines by 25° with respect to the first face 2a, and thus inclines 65° with respect to the finder optical axis 1. In addition, each of the reflective faces constituting the roof faces inclines by 45° with respect to the plane including the ridge line 2d and the finder optical axis 1. As a result, the normal line of each reflective face makes an angle of 50.1° with the finder optical axis 1. Accordingly, light beams coming out of the objective optical system 1 and entering this first prism 2 through the first face 2a are incident on the respective reflective faces of the roof faces constituting the second face 2b at incident angles of 50.1° on average. This average incident angle of 50.1° satisfies the total reflection condition described above, so that the light beams incident on the second face 2b are totally reflected by the roof faces while being inverted upside down, and the finder optical axis 1 is bent toward the object side at an angle of 50° within the plane of FIG. 1.

The finder optical axis 1 bent by the second face 2b and the normal line of the first face 2a make an angle of 50°, which means that the respective light beams reflected by the second face 2b are re-incident on the first face 2a at incident angle of 50° on average. Since this average incident angle of 50° is sufficient larger than the aforementioned critical angle θ of 41.8°, almost all of the light beams re-incident on the first face 2a with some divergence are totally reflected by this first face 2a, so that the finder optical axis 1 is bent at an angle of 100° within the plane of FIG. 1.

The finder optical axis 1 bent by the first face 2a then passes through the third face 2c. In a substantially rectangular area on this third face 2c around the finder optical axis 1 is formed a positive-powered lens surface 2e having its center of curvature on the finder optical axis 1. Therefore, the finder optical axis 1 is substantially perpendicular to the tangent plane of the lens surface 2e at the intersection with the finder optical axis 1. Accordingly, the finder optical axis 1 is not deviated by the third face 2c. This lens surface 2e functions as a condenser lens for providing coincidence between the exit pupil of the objective optical system 1 and the entrance pupil of the eyepiece lens 5.

In the field frame 3, the real image of the object is formed by the objective optical system 1 as an erected aerial image.

The second prism 4 has a shape of generally pentagonal prism with its bottom surface put on the plane of FIG. 1 (prescribed plane). This second prism 4 has side faces including a first face 4a as an entrance surface, a second face 4b as a reflective face, a third face 4c as a reflective face, and a fourth face 4d as an exit surface. The first face 4a is arranged to confront the third face 2c of the first prism 2 via the field frame 3 and to be substantially perpendicular to the finder optical axis 1. The second face 4b adjoins the eyepiece-side edge of the first face 4a at an angle of 29°. The third face 4c adjoins the object-side edge of the first face 4a at an angle of 94°. The fourth face 4d adjoins the second face 4b at an angle of 201°. This second prism 4 is also molded of transparent resin having a refractive index of 1.5. Therefore, the second prism 4 also has a critical angle θ of 41.8° as the total reflection condition for its internal reflection. The second prism 4, being a resinous article, can be obtained at lower costs.

Since the finder optical axis 1 transmitted through the first face 4a of this second prism 4 inclines by 50° with respect to the initial optical axis of the objective optical system 1, the first face 4a inclines by 40° with respect to the initial optical axis of the objective optical system 1. Light beams entering the second prism 4 through this first face 4a are reflected by the second face 4b toward the object side to be incident on the first face 4a. They are totally reflected by this first face 4a toward the third face 4c to be incident on this third face 4c. After reflected by this third face 4c toward the eyepiece side, the light beams come out of the second prism 4 through the fourth face 4d. This fourth face 4d serving as the exit surface is placed so as to be perpendicular to the initial optical axis of the objective optical system 1, so that the finder optical axis 1 transmitted through the fourth face 4d is in parallel to the initial optical axis of the objective optical system 1. Here, the angle formed between the finder optical axis 1 transmitted through the first face 4a and the normal line of the second face 4b is 29°, the angle formed between the finder optical axis 1 bent by the second face 4b and the normal line of the first face 4a is 58°, and the angle formed between the finder optical axis 1 bent by the first face 4a and the normal line of the third face 4c is 36°. Accordingly, if the total reflection condition for internal reflection on the first face 4a is preferentially satisfied, it is impossible to satisfy the total reflection conditions for the second face 4b and the third face 4c. Thus, reflective coating of aluminum is applied to the second face 4b and the third face 4c. Note that, in the front-to-back direction, the fourth face 4d is located at the same position as the object-side edge of the second face 4b.

The eyepiece lens 5 is arranged to confront the fourth face 4d of the second prism 4 and to be generally coaxial with the finder optical axis 1. The eyepiece lens 5 is held by a lens barrel (not shown) so as to be movable for adjustment of diopter within a moving range α which is set before and behind its standard position corresponding to −1 diopter with respect to the field frame 3 along the finder optical axis 1.

The cover glass 6 arranged behind the moving range α of the eyepiece lens 5 is a plane parallel plate, which is fit into a finder window formed in the unillustrated camera casing.

According to the real image type finder optical system of the first embodiment constituted as described above, the fourth face 4d of the second prism 4 positions on the object side of the second face 4b in the front-to-back direction (that is, the direction parallel to the initial optical axis of the objective optical system 1). Accordingly, in the front-to-back direction (that is, the direction parallel to the initial optical axis of the objective optical system 1), the moving range α of the eyepiece lens 5 overlaps with the optical path extending from the objective optical system 1 to the fourth face 4d of the second prism 4. This reduces overall length of the entire real image type finder optical system in the front-to-back direction as compared with conventional ones, so that the cover glass 6 need not be projected from the camera casing.

Incidentally, in non-telecentric objective optical systems, an exit pupil of the objective optical system typically positions within or near the objective optical system itself. Thus, the angles between off axial rays coming out of the exit pupil of the objective optical system 1 and its initial optical axis 1 may range to as large as +/−10° in the air. Accordingly, it is necessary to check over that each off axial ray satisfies the total reflection condition with respect to each reflective surface positioned on objective side of the lens surface 2c serving as the condenser lens. In the first embodiment, the finder optical axis 1 and the normal line of each reflective face constituting the roof faces form an angle of 50.1° and the finder optical axis 1 bent by the roof faces 2b and the normal line of the first face 2a form an angle of 50°. Here, the angle of +/−10° which the initial optical axis 1 of the objective optical system 1 and the off axial rays form in the air corresponds to an angle +/−6.7°(=10/1.5°) in a prism having a refractive index of 1.5. Therefore, the off axial rays and the normal line of each reflective face constituting the roof faces form an angle (i.e., incident angle) of a minimum of 43.4°, and the off axial rays and the normal line of the first face 2a form an angle (i.e., incident angle) of a minimum of 43.3°. As a result, since the incident angles of the off axial rays are enough larger than the critical angle of 41.8° for total reflection with respect to either of the reflective faces, it is able to be established that the all light beams including the off axial rays can be totally reflected.

Incidentally, in the first embodiment, the ridge line of the roof faces constituting the second face 2b of the first prism 2 makes an angle θ1 of 25° with respect to the first face 2a of the first prism 2. This angle may be modified to some extent. The preferable range, however, is such that 23.5°<θ1<26.5°. If the angle θ1 is equal to or smaller than 23.5°, off axial rays are intercepted as described above.

Whereas, if the angle θ1 is equal to or greater than 26.5, the size of the first prism 2 is increased.

While, in the first embodiment, the second face 2b of the first prism 2 is formed as the roof faces, this second face 2b may be formed as a plane surface and the second face 4b of the second prism 4 be formed as roof faces. In this case, the second face 2b of the first prism 2 requires reflective coating of aluminum thereon since it does not satisfy the total reflection condition for the light beams. Meanwhile, the second face 4b of the second prism 4 constituted as the roof faces does satisfy the total reflection condition for the light beams, thereby the need for reflective coating is eliminated.

Size of a prism provided with roof faces is greater than that having no roof faces. Even so, the first prism 2 may be smaller in vertical thickness as compared with the second prism 4. Therefore, formation of roof faces on the second face 2b of the first prism 2 does not require a large increase in the size of the prism 2 to lengthen the finder optical axis 1. In contrast, if the roof faces are formed on the second face 4b of the second prism 4, each reflective face of the roof faces can be eased in accuracy of relative angle since the second face 4b of the second prism 4 positions closer to the position of the image of the object formed by the objective optical system 1 (that is, the position of the field frame 3).

Second Embodiment

A second embodiment of the present invention involves improvements on the first embodiment with a view to miniaturizing a second prism 14 and dispensing with reflective coating on a third face 14c thereof. The first face 2a of the first prism 2 according to the first embodiment described above is arranged to be substantially perpendicular to the initial optical axis of the objective optical system 1. As a result, if the incident angle of the light beams re-incident on the first face 2a are set 50° for the purpose of satisfying the total reflection condition on this first face 2a, the finder optical axis extending from this first face 2a through the third face 2c to the second prism 4 inevitably forms an angle of 50° with respect to the initial optical axis of the objective optical system 1. This increases the second prism 4 in size as described above, precluding the satisfaction of the total reflection condition for some light beams incident on the third face 4c. Accordingly, the present embodiment have improvements that a correcting prism 11 is arranged immediately before of a first face 12a as the entrance surface of a first prism 12 so that the perpendicular condition from between the initial optical axis of the objective optical system 1 and the first face 12a is made redundant and that the finder optical axis 1 extending from the first face 12a through a third face 12c to the second prism 14 is set to form an angle of 45° with respect to the initial optical axis of the objective optical system 1 while the total reflection condition is satisfied for the light beams incident on each of the roof faces constituting a second face 12b and for the light beams re-incident on the first face 12a. Thereby, the total reflection condition is satisfied for the light beams re-incident on a first face 14a of the second prism 14 and for the light beams incident on the third face 14c as well.

Figure 2:
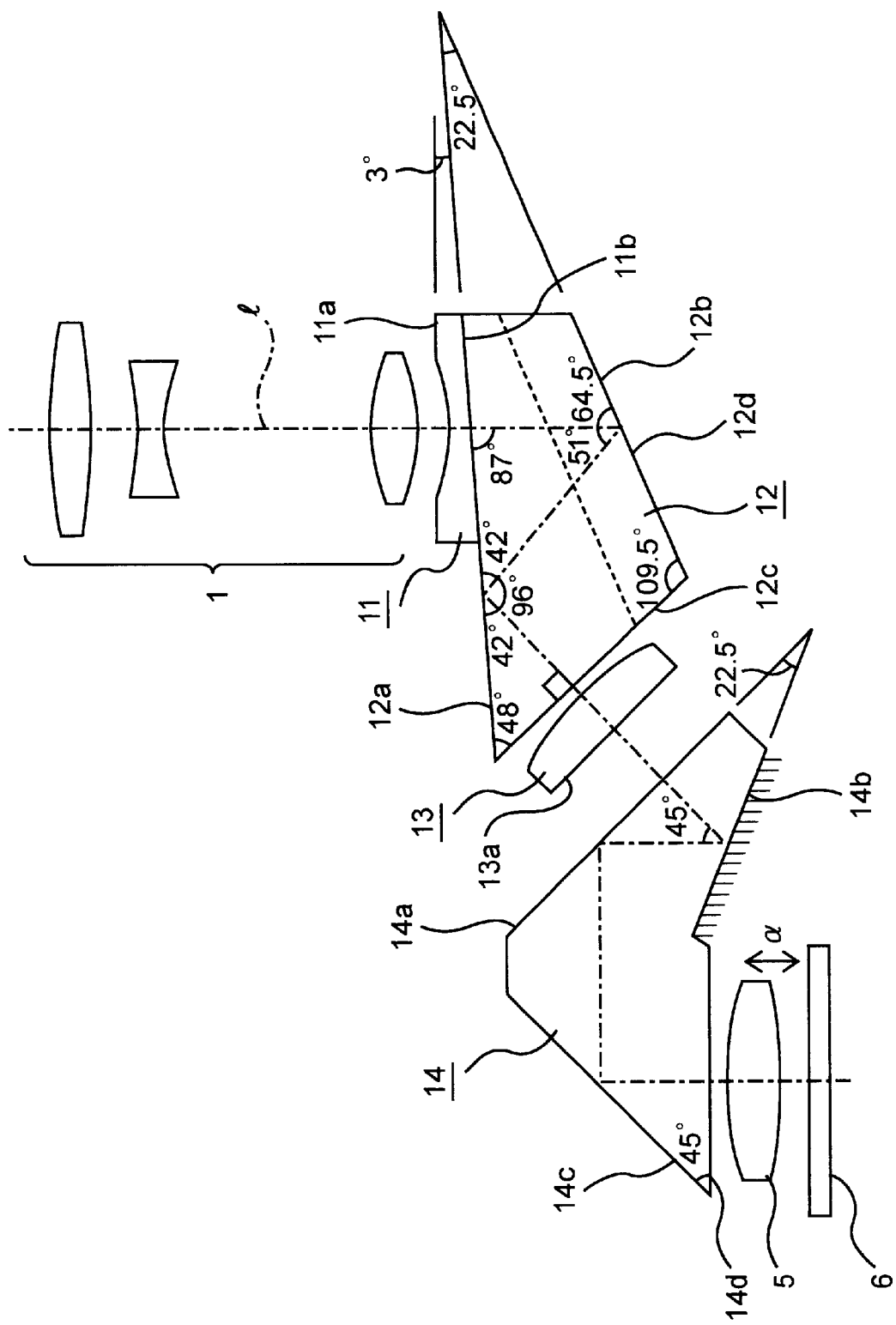
FIG. 2 is a plan view of the real image type finder optical system according to a second embodiment of the present invention.

FIG. 2 is a plan view of the real image type finder optical system according to the second embodiment of the present invention. The top-to-bottom direction in the figure corresponds to the front-to-back direction of this real image type finder optical system, in other words, the direction connecting an object and a photographer's eye.

As shown in this FIG. 2, the real image type finder optical system according to the second embodiment comprises, in order from the object side along the finder optical axis 1, an objective optical system 1, the correcting prism 11, the first prism 12, a condenser lens 13, the second prism 14, an eyepiece lens 5 and a cover glass 6. Since the objective optical system 1, the eyepiece lens 5 and the cover glass 6 are exactly the same as those in the first embodiment described above, description thereto will be omitted.

The correcting prism 11 is an optical wedge in which the tangent plane of its front face 11a at the intersection with the optical axis 1 makes an angle of 3° with its back face 11b. The correcting prism 11 is directed so that the front face 11a and the back face 11b approach each other on the side where the first face 12a and the second face 12b of the first prism 12 approach each other. In the front face 11a of the correcting prism 11 is formed a negative-powered concave surface which constitutes a part of the objective optical system 1. The correcting prism 11 is arranged so that the tangent plane of this concave surface at the intersection with the optical axis 1 is generally rectangular to the optical axis 1.

The first prism 12 is formed of transparent resin having a refractive index of 1.5. Accordingly, the total reflection condition of this first prism 2 for its internal reflection is that a critical angle θ is 41.8°. The first prism 12, being a resinous article, can be obtained at lower costs. This first prism 12 has side faces including the above described first face 12a, the second face 12b, and the third face 12c as the exit surface. The second face 12b is consisted of roof faces comprising a pair of reflective faces which meet each other with a right angle therebetween along a ridge line 12d tilted by 22.5° with respect to the first face 12a. The third face 12c adjoins the first face 12a at an angle of 48° on the side where the first face 12a and the second face 12b draw apart from each other.

The first face 12a of the first prism 12 is placed in parallel with the back face 11b of the correcting prism 11 with air layer intervening therebetween. In this connection, the wedge angle of the correcting prism 11 is set to correct the direction of the finder optical axis 1 to be bent by the first face 12a of the first prism 12.

The ridge line 12d of the roof faces constituting the second face 12b of the first prism 12 inclines 22.5° with respect to the first face 12a which inclines 3° with respect to the front face 11a of the correcting prism 11. Accordingly, the second face 12b inclines in the same direction as the first face 12a, and the ridge line 12d thereof inclines 64.5° with respect to the finder optical axis 1. In addition, each reflective face constituting the roof faces inclines by 45° with respect to the plane including the ridge line 12d and the finder optical axis 1. As a result, the normal line of each reflective face and the finder optical axis 1 form an angle of 50.4°. Therefore, light beams, coming out of the objective optical system 1 and passing through the correcting prism 11 to enter this first prism 12 through the first face 12a, are incident on each reflective face of the roof faces constituting this second face 12b at incident angles of 50.4° on average. Since this average incident angle of 50.4° satisfies the total reflection condition described above, the light beams incident on the second face 12b are totally reflected by the roof faces while being inverted upside down, and the finder optical axis 1 is bent toward the object side at an angle of 51° within the plane of FIG. 2.

The finder optical axis 1 bent thus makes an angle of 48° with the normal line of the first face 12a. Therefore, the light beams reflected by the second face 12b are re-incident on the first face 12a at incident angles of 48° on average. In case the average incident angle is 48°, a margin from the critical angle of the total reflection condition becomes 6.2°. This value is not exactly sufficient considering marginal rays, but most of off axial rays are reflected by the first face 12a and the finder optical axis 1 is bent toward the eyepiece side at an angle of 96° within the plane of FIG. 2.

The finder optical axis 1 bent thus inclines 45° with respect to the initial optical axis of the objective optical system 1. Since the third face 12c is perpendicular to this optical axis, the light beams totally reflected by the first face 12a pass through this third face 12c to enter the condenser lens 13.

The condenser lens 13 is a planoconvex lens having a focal plane 13a formed on its back face. On the focal plane 13a is formed the erected real image of the object formed by the objective optical system 1. This condenser lens 13 functions to provide coincidence between the exit pupil of the objective optical system 1 and the entrance pupil of the eyepiece lens 5.

The second prism 14 has shape of generally polygonal prism with its bottom surface put on the plane of FIG. 2. This second prism 14 has side faces including the first face 14a as the entrance surface, a second face 14b as a reflective face, the third face 14c, and a fourth face 14d as the exit surface. The first face 14a is arranged to confront the third face 12c of the first prism 12 via the condenser lens 13 and to be substantially perpendicular to the finder optical axis 1. The second face 14b is opposed to the first face 14a at an angle of 22.5° to bent the finder optical axis transmitted through the first face 14a toward the object side at an angle of 45°. The third face 14c is arranged so that the finder optical axis transmitted from the first face 14a and thereafter bent by the second face 14b at a right angle is further bent toward the eyepiece side at a right angle. The fourth face 14d adjoins the third face 14c at an angle of 45°, and is discontinuously adjacent to the second face 14b. This second prism 14 is molded of transparent resin having a refractive index of 1.5. Therefore, the total reflection condition of this second prism 14 for its internal reflection is that a critical angle θ is 41.8°.

The finder optical axis 1 transmitted through the first face 14a of this second prism 14 and the normal line of the second face 14b form an angle of 22.5°, which does not satisfy the total reflection condition for incident light beams. On that account, reflective coating of aluminum is applied to the second face 14b. The second face 14b bends the finder optical axis 1 toward the object side, in parallel to the initial optical axis of the objective optical system 1. The finder optical axis 1 bent by the second face 14b makes an angle of 45° with the normal line of the first face 14a. Therefore, the light beams are incident on this first face 14a at incident angles of 45° on average. Here, the off axial rays entering the second prism 14 are made to be substantially telecentric beams by the condenser lens 13. The eyepiece lens 5 functions like as an entrance-side telecentric optical system, since its exit pupil is positioned near the rear focus thereof. This provides the off axial rays entering the second prism 14 with small incident angles on the order of +/−5° in the air, which corresponds to an angle of +/−3.3° in the prism 14 having a refractive index of 1.5. Therefore, even marginal rays are incident on the first face 14a at an incident angle of 41.7°, so that the total reflection condition is almost satisfied. As a result, the light beams re-incident on this first face 14a are totally reflected toward the third face 14c, and the finder optical axis 1 is bent by the first face 14a in the direction substantially perpendicular to the initial optical axis of the objective optical system 1. Since the finder optical axis 1 bent by this first face 14a makes an angle of 45° with the normal line of the third face 14c, the light beams are incident on this third face 14c at incident angles of 45° on average, which satisfies the total reflection condition. Hence, the light beams incident on this third face 14c are totally reflected toward the fourth face 14d, and the finder optical axis 1 is bent by the third face 14c toward the eyepiece side, in parallel to the initial optical axis of the objective optical system 1. Since the finder optical axis 1 bent by this third face 14c makes approximately 90° with the fourth face 14d, the light beams incident on this fourth face 14d are transmitted through the fourth face 14d. In the front-to-back direction, this fourth face 14d is located at almost the same position as that of the object-side edge of the second face 14b.

According to the real image type finder optical system of the second embodiment consisted as described above, the fourth face 14d of the second prism 14 positions on the object side of the second face 14b in the front-to-back direction (that is, the direction parallel to the initial optical axis of the objective optical system 1). Accordingly, in the front-to-back direction (that is, the direction parallel to the initial optical axis of the objective optical system 1), the moving range α of the eyepiece lens 5 overlaps with the optical path extending from the objective optical system 1 to the fourth face 14d of the second prism 14. This reduces overall length of the entire real image type finder optical system in the front-to-back direction as compared with conventional ones, so that the cover glass 6 need not be projected from the camera casing. Besides, the interposition of the correcting prism 11 allows the finder optical axis 1 extending from the fourth face 12d of the first prism 12 to the first face 14a of the second prism 14 to form an angle of 45° with respect to the initial optical axis of the objective optical system 1. This satisfies within the second prism 14 the total reflection condition for the light beams re-incident on the first face 14a as well as the total reflection condition for the light beams incident on the third face 14c. As a result, reflective coating on this third face 14c can be omitted.

While, in the second embodiment, the second face 12b of the first prism 12 is formed as the roof faces, this second face 12b may be formed as a plane surface and the second face 14b of the second prism 14 be formed as roof faces. In this case, the second face 12b of the first prism 12 requires reflective coating of aluminum thereon since it does not satisfy the total reflection condition for the light beams. Meanwhile, the second face 14b of the second prism 14 constituted as the roof faces does satisfy the total reflection condition for the light beams, thereby the need for reflective coating is eliminated.

Size of a prism provided with roof faces is greater than that having no roof faces. Even so, the first prism 12 may be smaller in vertical thickness as compared with the second prism 14. Therefore, formation of roof faces on the second face 12b of the first prism 12 does not require a large increase in the size of the prism 12 to lengthen the finder optical axis 1. In contrast, if the roof faces are formed on the second face 14b of the second prism 14, each reflective face of the roof faces can be eased in accuracy of relative angle since the second face 14b of the second prism 14 positions closer to the position of the image of the object which is formed by the objective optical system 1.

Third Embodiment

In comparison with the second embodiment described above, a third embodiment of the present invention is to separate the function of the third face 14c from the second prism 14 and replace it with a plane mirror 27.

Figure 3:
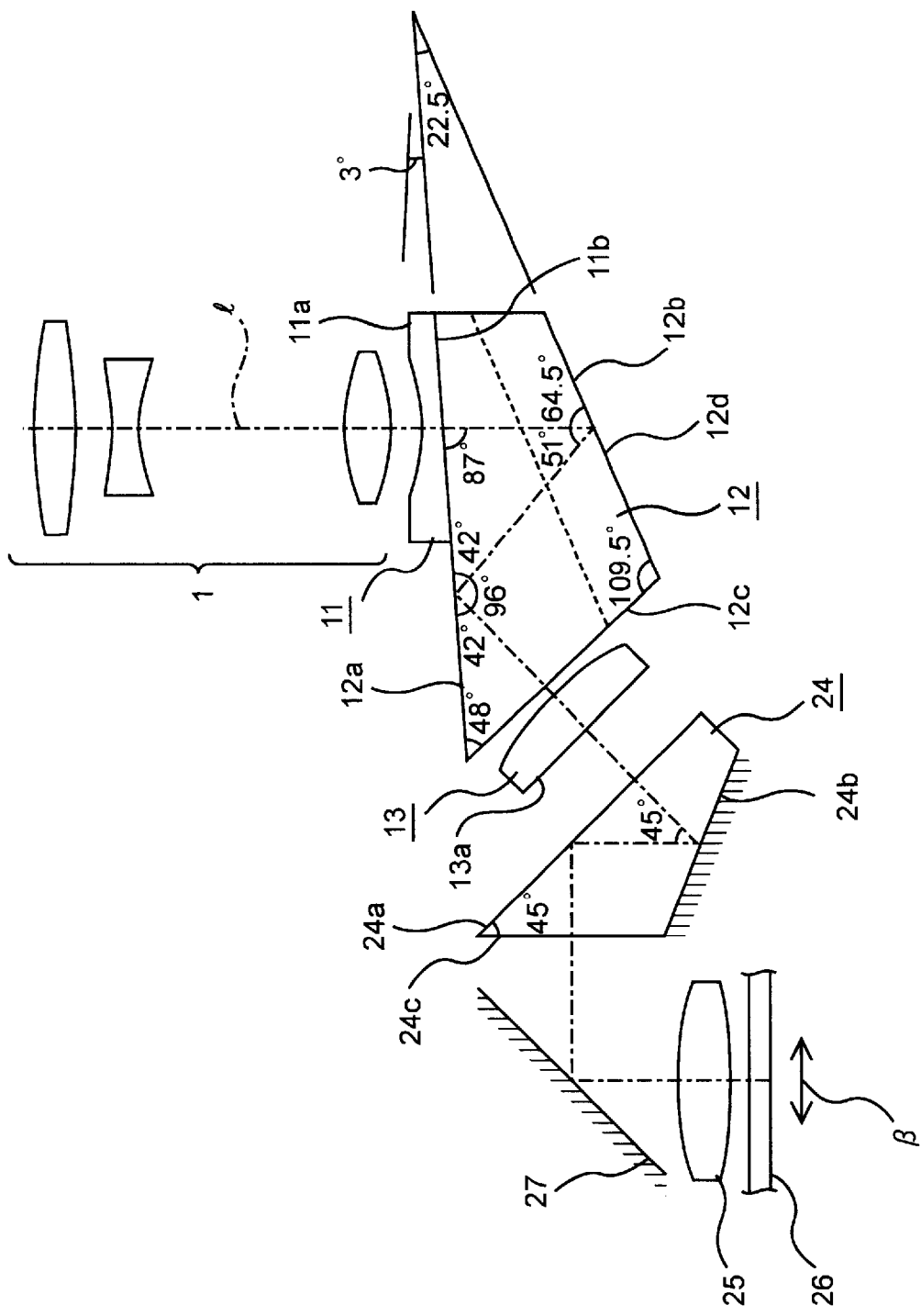
FIG. 3 is a plan view of the real image type finder optical system according to a third embodiment of the present invention.

FIG. 3 is a plan view of the real image type finder optical system according to the third embodiment of the present invention. The top-to-bottom direction in the figure corresponds to the front-to-back direction of this real image type finder optical system, in other words, the direction connecting an object and a photographer's eye.

As shown in this FIG. 3, the real image type finder optical system according to the third embodiment comprises, in order from the object side along the finder optical axis 1, an objective optical system 1, a correcting prism 11, a first prism 12, a condenser lens 13, a second prism 24, the plane mirror 27, an eyepiece lens 25 and a cover glass 26. Since the objective optical system 1, the correcting prism 11, the first prism 12 and the condenser lens 13 are exactly the same as those in the second embodiment described above, description thereto will be omitted.

The second prism 24 has shape of a quadrilateral prism with its bottom surface put on the plane of FIG. 3. This second prism 24 has side faces including a first face 24a as the entrance surface, a second face 24b as a reflective face and a third face 24c as the exit surface. The first face 24a is arranged to confront the third face 12c of the first prism 12 via the condenser lens 13 and to be substantially perpendicular to the finder optical axis 1. The second face 24b is opposed to the first face 24a at an angle of 22.5° to bend the finder optical axis 1 transmitted through the first face 24a toward the object side at an angle of 45°. The third face 24c adjoins this first face 24a at an angle of 45° in order to transmit the light beams which are re-incident on the first face 24a from the second face 24b and thereby total-reflected. This second prism 24 is molded of transparent resin having a refractive index of 1.5. Accordingly, the total reflection condition of this second prism 24 for its internal reflection is that a critical angle θ is 41.8°.

The finder optical axis 1 transmitted through the first face 24a of this second prism 24 and the normal line of the second face 24b make therebetween an angle of 22.5°, which does not satisfy the total reflection condition for incident light beams. On that account, reflective coating of aluminum is applied to this second face 24b. The second face 24b bends the finder optical axis 1 toward the object side, in parallel to the initial optical axis of the objective optical system 1. The finder optical axis 1 bent by the second face 24b makes an angle of 45° with the normal line of the first face 24a. Therefore, the light beams are incident on this first face 24a at incident angles of 45° on average. Here, the off axial rays entering the second prism 24 are made to be substantially telecentric beams by the condenser lens 13. The eyepiece lens 25 functions like as an entrance-side telecentric system, since its exit pupil is positioned near the rear focus thereof. This provides the off axial rays entering the second prism 24 with small incident angles on the order of +/−5° in the air, which corresponds to an angle of +/−3.3° in the prism 24 having a refractive index of 1.5. Therefore, even marginal rays are incident on the first face 24a at an incident angle of 41.7°, so that the total reflection condition is almost satisfied. As a result, the light beams re-incident on this first face 24a are totally reflected toward the third face 24c, and the finder optical axis 1 is bent by this first face 24a in the direction substantially perpendicular to the initial optical axis of the objective optical system 1. Since the finder optical axis 1 bent by this first face 24a makes an angle of approximately 90° with the third face 24c, the light beams incident on the third face 24c are transmitted through this third face 24c.

The plane mirror 27 is placed to cross the finder optical axis 1 transmitted through the third face 24c of the second prism 24 at an angle of 45°, so as to bend this finder optical axis 1 toward the eyepiece side in parallel to the initial optical axis of the objective optical system 1. As a result, the plane mirror 27 bends the finder optical axis 1 transmitted through the third face 24c of the second prism 24 toward the eyepiece side at an angle of 90°. In the front-to-back direction, the edge of this plane mirror 27 on the eyepiece side is located at almost the same position as that of the second face 24b of the second prism 24 at the object-side edge (the edge to meet the third face 24c). The eyepiece lens 25 for magnifying the image of the object formed on the focal plane 13a is fixed relative to the plane mirror 27 so as to be substantially coaxial with the finder optical axis 1 bent by the plane mirror 27. The plane mirror 27 and the eyepiece lens 25 are then moved as a unit along directions substantially perpendicular to the initial optical axis of the objective optical system 1 (that is, the directions shown by the arrows β) while maintaining the relative positions thereof, which enables the diopter of the eyepiece lens 25 to be adjusted with respect to the focal plane 13a. In this connection, the cover glass 26 fit into a camera casing (not shown) has a width enough to cover the entire moving range of the eyepiece lens 25.

According to the real image type finder optical system of the third embodiment constituted as described above, the diopter of the eyepiece lens 25 is adjustable by moving the eyepiece lens 25 along the directions substantially perpendicular to the initial optical axis of the objective optical system 1, which avoids need to provide the moving range for adjustment of the eyepiece lens 25 along the direction parallel to the initial optical axis of the objective optical system 1. Therefore, as compared to the first and second embodiments, the cover glass 26 can be arranged still closer to the object side so that the overall length of the real image type finder optical system along the front-to-back direction is reduced.

While, in the third embodiment, the second face 12b of the first prism 12 is formed as the roof faces, this second face 12b may be formed as a plane surface and the second face 24b of the second prism 24 or reflecting surface of the mirror 27 may be formed as roof faces. In this case, the second face 12b of the first prism 12 requires reflective coating of aluminum thereon since it does not satisfy the total reflection condition for the light beams. Meanwhile, the second face 24b of the second prism 24 constituted as the roof faces does satisfy the total reflection condition for the light beams, thereby the need for reflective coating is eliminated.

Fourth Embodiment

In comparison with the third embodiment described above, a fourth embodiment of the present invention has a construction in which the second face 12b of the first prism 12 is formed as a plane surface, in which the second face 24b of the second prism 24 is formed as roof faces, and in which the functions of the plane mirror 27 and the eyepiece lens 25 are replaced with a single eyepiece reflecting prism 35.

Figure 4:
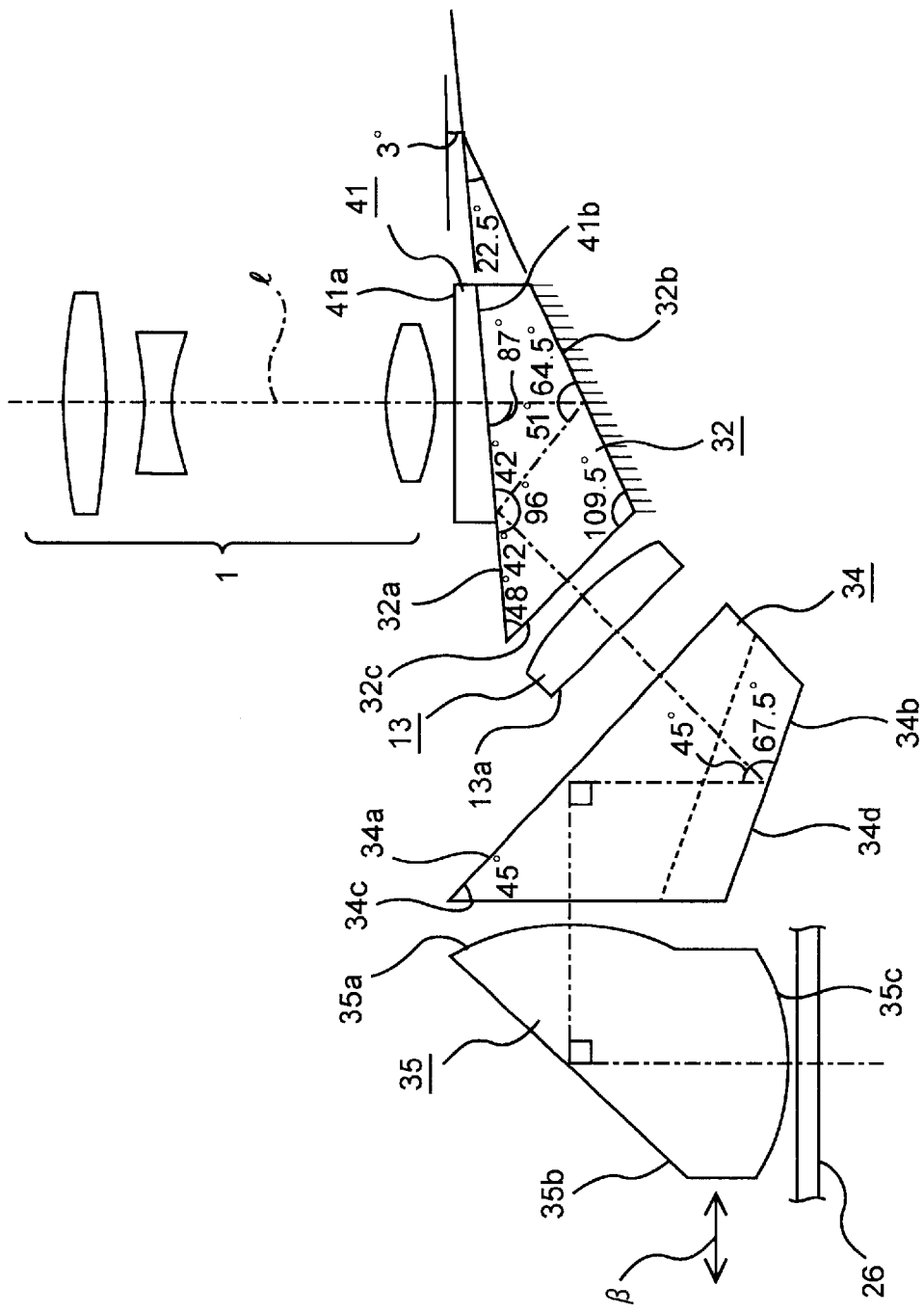
FIG. 4 is a plan view of the real image type finder optical system according to a fourth embodiment of the present invention.

FIG. 4 is a plan view of the real image type finder optical system according to the fourth embodiment of the present invention. The top-to-bottom direction in the figure corresponds to the front-to-back direction of this real image type finder optical system, in other words, the direction connecting an object and a photographer's eye.

As shown in this FIG. 4, the real image type finder optical system according to the fourth embodiment comprises, in order from the object side along the finder optical axis 1, an objective optical system 1, a correcting prism 41, a first prism 32, a condenser lens 13, a second prism 34, the eyepiece reflecting prism 35 and a cover glass 26. Since the objective optical system 1, the condenser lens 13 and the cover glass 26 are exactly the same as those in the third embodiment described above, description thereto will be omitted.

The correcting prism 41 is an optical wedge with its front face 41a and back face 41b making therebetween an angle of 3° and is directed so that the front face 41a and the back face 41b approach each other on the side where a first face 32a and a second face 32b of the first prism 32 approach each other. This correcting prism 41 is arranged so that the front face 41a thereof is perpendicular to the optical axis 1.

The first face 32a of the first prism 32 is placed in parallel with the back face 41b of the correcting prism 41 with air layer intervening therebetween. The first prism 32 is formed of transparent resin having a refractive index of 1.5. Thus, the total reflection condition of this first prism 32 for its internal reflection is that a critical angle θ is 41.8°. The first prism 32 has shape of a quadrilateral prism with its bottom surface put on the plane of FIG. 4. The first prism 32 has side faces including the above-described first face 32a as the entrance face, the second face 32b as a reflective face and a third face 32c as the exit surface. The second face 32b is opposed to the first face 32a at an inclined angle of 22.5°. The third face 32c adjoins the first face 32a at an angle of 48° on the side where the first face 32a and the second face 32b draw apart from each other.

Light beams coming out of the objective optical system 1 pass through the correcting prism 41 and enter this first prism 32 through the first face 32a. Then, these light beams are incident on the second face 32b at incident angles of 25.5° on average. Since the incident angle of 25.5° does not satisfy the total reflection condition described above, reflective coating of aluminum is applied to this second face 32b. As a result, the light beams incident on the second face 32b are reflected toward the first face 32a and the finder optical axis 1 is bent toward the object side at an angle of 51° within the plane of FIG. 4.

The finder optical axis 1 thus bent makes an angle of 48° with the normal line of the first face 32a. Thus, the light beams reflected by the second face 32b are re-incident on the first face 32a at incident angles of 48° on average. As in the second and third embodiments, the average incident angle of 48° satisfy the total reflection condition, so that the light beams re-incident on the first face 32a are totally reflected and the finder optical axis 1 is bent toward the eyepiece side at an angle of 96° within the plane of the FIG. 4.

The finder optical axis 1 thus bent inclines 45° with respect to the initial optical axis of the objective optical system 1. Since the third face 32c is substantially perpendicular to this optical axis, the light beams totally reflected by the first face 32a pass through this third face 32c to enter the condenser lens 13.

The second prism 34 has side faces including a first face 34a as the entrance surface, a second face 34b, and a third face 34c as the exit surface. The first face 34a is arranged to confront the third face 32c of the first prism 32 via the condenser lens 13 and to be substantially perpendicular to the finder optical axis 1. The second face 34b is consisted of roof faces comprising a pair of reflective faces which meet each other with a right angle therebetween along a ridge line 34d tilted by 22.5° with respect to the first face 34a. The third face 34c adjoins the first face 34a at an angle of 45° on the side where the first face 34a and the second face 34b draw apart from each other. This second prism 34 is also molded of transparent resin having a refractive index of 1.5. Thus, the total reflection condition of this second prism 34 for its internal reflection is that a critical angle θ is 41.8°.

The light beams which had once formed the inverted real image of the object on the focal plane 13a of the condenser lens 13 pass through the first face 34a to enter the second prism 34. The ridge line 34d between the roof faces constituting the second face 34b of this second prism 34 is inclined by 22.5° with respect to the first face 34a, and therefore inclines 67.5° with respect to the finder optical axis 1. In addition, each reflective face of the roof faces is inclined by 45° with respect to the plane including the ridge line 34d and the finder optical axis 1. As a result, the normal line of each reflective face and the finder optical axis 1 form an angle of 50.4°. This means that the light beams coming out of the focal plane 13a to enter this second prism 34 through the first face 34a are incident on each reflective face of the roof faces constituting the second face 34b at incident angles of 50.4° on average. This average incident angle of 50.4° satisfies the total reflection condition described above. Therefore, the light beams incident on the second face 34b are totally reflected by the roof faces while being inverted upside down, and the finder optical axis 1 is bent toward the object side at an angle of 45° within the plane of FIG. 4, in parallel to the initial optical axis of the objective optical system 1. Since the finder optical axis 1 bent by this second face 34b and the normal line of the first face 34a makes an angle of 45°, the light beams are incident on this first face 34a at incident angles of 45° on average to satisfy the total reflection condition. Thus, the light beams re-incident on this first face 34a are totally reflected toward the third face 34c, and the finder optical axis is bent in the direction substantially perpendicular to the initial optical axis of the objective optical system 1. The finder optical axis 1 bent by the first face 34a forms an angle of substantially 90° with the third face 34c, so that the light beams incident on the third face 34c are transmitted through this third face 34c.

The eyepiece and reflecting prism 35 has an entrance face 35a which confronts to the third face 34c of the second prism 34, a reflective face 35b which bends the finder optical axis 1 transmitted through the entrance face 35a toward the eyepiece side at 90° and an exit face 35c which crosses at right angles the finder optical axis 1 bent by the reflective face 35b. The entrance and exit faces 35a and 35c are respectively formed as positive-powered spherical surfaces with their center of curvature being on the finder optical axis 1, so that they function as an eyepiece lens for observing the real image of the object on the focal plane 13a, as a whole. Here, the image of the object (which is a virtual image) observed through this eyepiece and reflecting prism 35 is an erect image. The angle formed between the finder optical axis 1 and the normal line of the reflective face 35b is 45°, so that the reflective face 35b satisfies the total reflection condition for incident light beams. The eyepiece and reflecting prism 35 is moved along directions substantially perpendicular to the initial optical axis of the objective optical system 1 (that is, the directions of the arrows ), which enables the diopter of the eyepiece and reflecting prism 35 to be adjusted with respect to the focal plane 13a.

According to the real image type finder optical system of the fourth embodiment constituted as described above, the diopter of the eyepiece and reflecting prism 35 is adjustable by moving the eyepiece and reflecting prism 35 along the directions substantially perpendicular to the initial optical axis of the objective optical system 1, which avoids the need to provide the moving range for adjustment of the eyepiece and reflecting prism 35 along the directions parallel to the initial optical axis of the objective optical system 1. Therefore, as compared to the first and second embodiments, the cover glass 26 can be arranged still closer to the object side so that the overall length of the real image type finder optical system along the front-to-back direction is reduced. Besides, the functions of the eyepiece lens and the reflecting mirror can be achieved by a single member, that is, the eyepiece reflecting prism 35, thereby the manufacturing costs is saved.

While, in the fourth embodiment, the second face 34b of the second prism 34 is formed as the roof faces, this second face 34b may be formed as a plane surface and the second face 32b of the first prism 32 may be formed as roof faces. In this case, the second face 34b of the second prism 34 requires reflective coating of aluminum thereon since it does not satisfy the total reflection condition for the light beams. Meanwhile, the second face 32b of the first prism 32 constituted as the roof faces does satisfy the total reflection condition for the light beams, thereby the need for reflective coating is eliminated. Moreover, the second face 34b of the second prism 34 may also be formed as a plane surface and the reflective face 35b of the eyepiece reflecting prism 35 may be formed as roof faces.

Fifth Embodiment

In comparison with the second embodiment described above, a fifth embodiment of the present invention has a construction in which the correcting prism 11 and the first prism 12 is replaced with a single prism (that is, a first prism 42) for inclining the finder optical axis 1 at 45° with respect to the initial optical axis of the objective optical system 1 and in which the condenser lens 13 is inverted.

Figure 5:
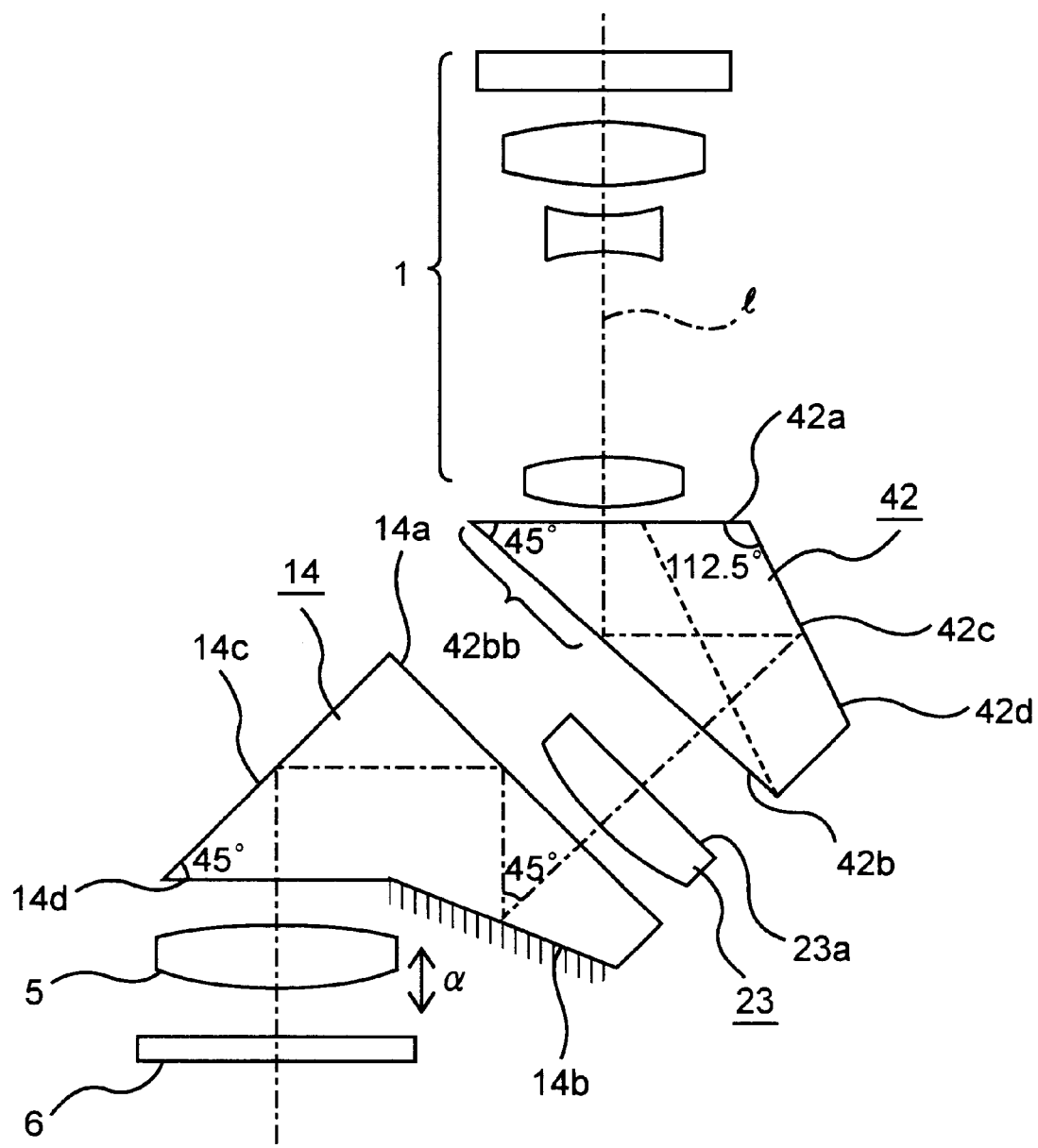
FIG. 5 is a plan view of the real image type finder optical system according to a fifth embodiment of the present invention.
Figure 6:
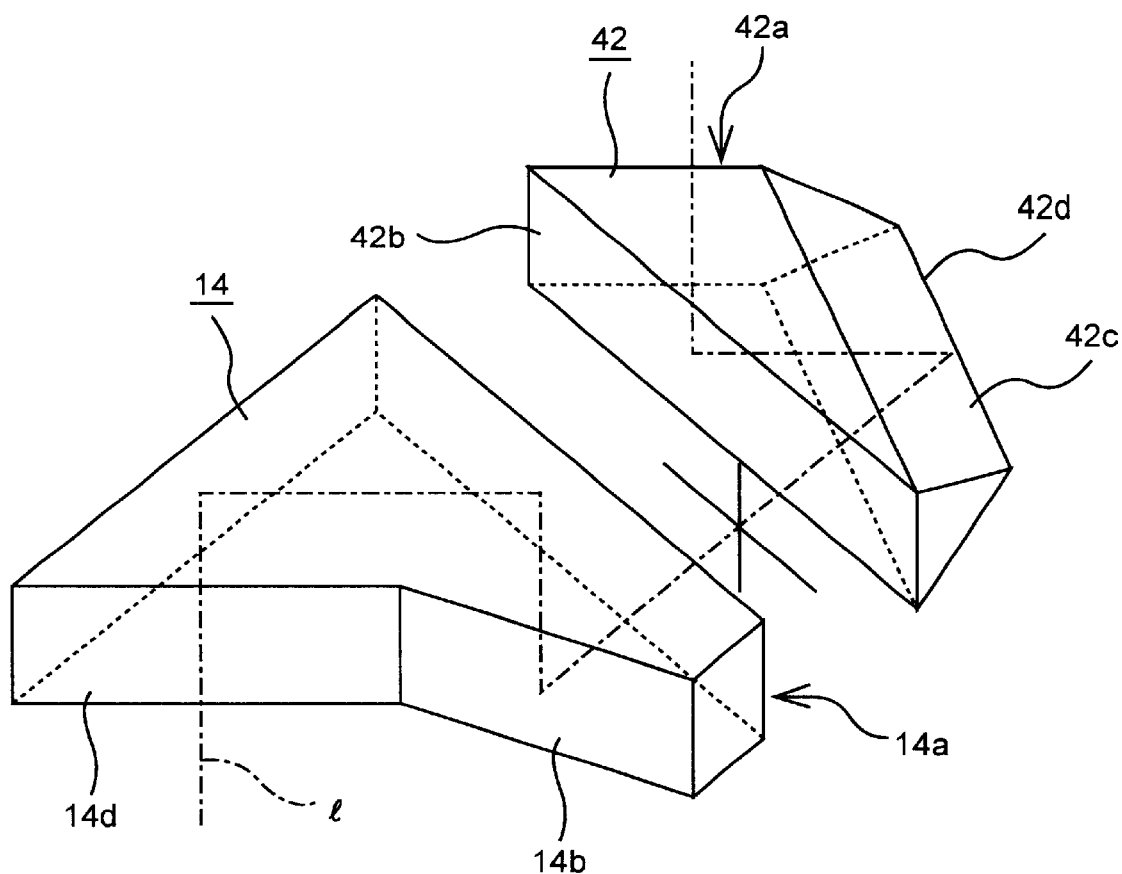
FIG. 6 is a perspective view showing the first and second prisms shown in FIG. 5.

FIG. 5 is a plan view of the real image type finder optical system according to the fifth embodiment of the present invention. The top-to-bottom direction in the figure corresponds to the front-to-back direction of this real image type finder optical system, in other words, the direction connecting an object and a photographer's eye. In addition, FIG. 6 is a perspective view of the first prism 42 and the second prism 14 shown in FIG. 5.

As shown in FIG. 5, the real image type finder optical system according to the fifth embodiment comprises, in order from the object side along the finder optical axis 1, an objective optical system 1, the first prism 42, a condenser lens 23, a second prism 14, an eyepiece lens 5 and a cover glass 6. Since the objective optical system 1, the second prism 14, the eyepiece lens 5 and the cover glass 6 are exactly the same as those in the second embodiment described above, description thereto will be omitted.

The first prism 42 has side faces including first through third faces 42a–42c. The first face 42a confronts the exit plane of the objective optical system 1 and is substantially perpendicular to the finder optical axis 1. The second face 42b adjoins the first face 42a at an angle of 45°. The third face 42c is consisted of roof faces comprising a pair of reflective faces which meet each other with a right angle therebetween along a ridge line inclines by 22.5° with respect to the second face 42b and by 112.5° with respect to the first face 42a. This first prism 42 is molded of transparent resin having a refractive index of 1.5. Thus, the total reflection condition of this first prism 42 for its internal reflection is that a critical angle θ is 41.8°.

Since the normal line of the second face 42b of the first prism 42 and the finder optical axis 1 make an angle of 45°, the finder optical axis 1 is bent 90° laterally. Among the light beams coming out of the non-telecentric type objective optical system 1 to enter the first prism 42 through the first face 42a, some of those incident on a region 42bb of the second face 42b nearer to the objective optical system 1 than the intersection with the optical axis 1 do not satisfy the total reflection condition with respect to the second face 42b. On that account, reflective coating of aluminum is applied to the region 42bb. The light beams reflected by the third face 42c are not incident on this region, therefore, no light beams will be intercepted by this reflective coating.

The ridge line 42d between the roof faces constituting the third face 42c of the first prism 42 is inclined by 22.5° with respect to the second face 42b, and therefore inclines 67.5° with respect to the finder optical axis 1. In addition, each of the reflective faces constituting the roof faces inclines by 45° with respect to the plane including the ridge line 42d and the finder optical axis 1. As a result, the normal line of each reflective face and the finder optical axis 1 form an angle of 50.4°. Accordingly, the light beams reflected by the second face 42b are incident on each reflective face of the roof faces constituting this third face 42c at incident angles of 50.4° on average. Since this average incident angle of 50.4° satisfies the total reflection condition described above, the light beams incident on the third face 42c are totally reflected by the roof faces while being inverted upside down, and the finder optical axis 1 is bent toward the eyepiece side at an angle of 45° within the plane of FIG. 5. The finder optical axis 1 bent by this third face 42c makes approximately 90° with the second face 42b, so that the light beams re-incident on the second face 42b from the third face 42c are transmitted through this second face 42b.

The condenser lens 23 which confronts the second face 42b of the first prism 42 and which is positioned generally coaxial with the finder optical axis 1 is a planoconvex lens having a focal plane 23a on which the elected real image of the object is formed by the objective optical system 1. This condenser lens 23 functions to provide coincidence between the exit pupil of the objective optical system 1 and the entrance pupil of the eyepiece lens 5.

The light beams transmitted through this condenser lens 23 to enter the second prism 14 are then transmitted through the second prism 14 along the finder optical axis 1 to come out through the fourth face 14d. The eyepiece lens 5 through which the light beams coming out of the second prism 14 pass is a lens for magnifying the image of the object formed on the focal plane 23a. This eyepiece lens 5 is movably adjusted along the finder optical axis 1 for diopter adjustment.

According to the real image type finder optical system of the fifth embodiment consisted as described above, the fourth face 14d of the second prism 14 is located on the object side of the second face 14b in the front-to-back direction (that is, the direction parallel to the initial optical axis of the objective optical system 1). Therefore, in the front-to-back direction (that is, the direction parallel to the initial optical axis of the objective optical system 1), the moving range α of the eyepiece lens 5 overlaps with the optical path extending from the objective optical system 1 to the fourth face 14d of the second prism 14. This overlap, therefore, realizes miniaturization of the entire finder optical system in the front-to-back direction and miniaturization thereof in the lateral direction as well.

Sixth Embodiment

Figure 7:
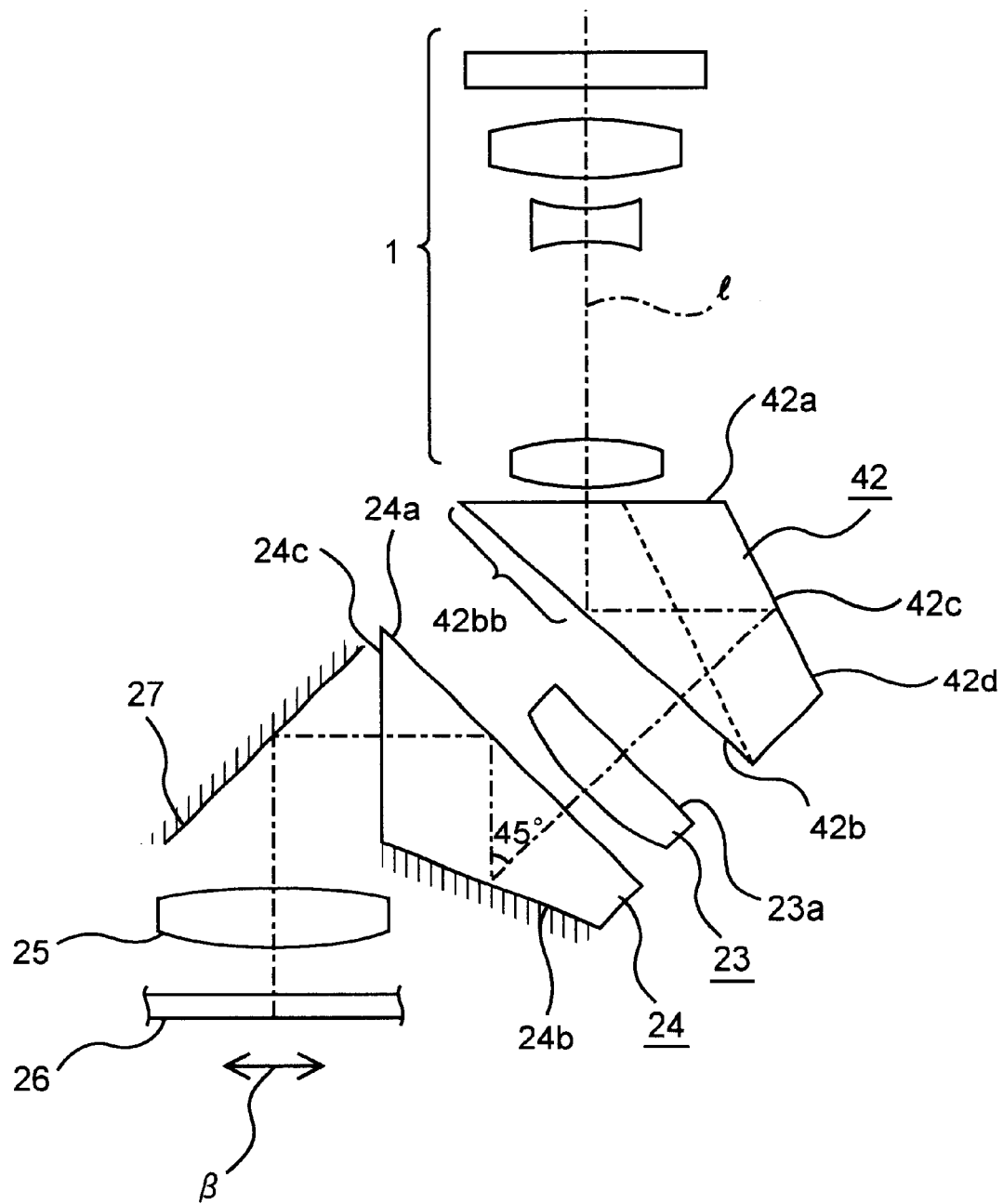
FIG. 7 is a plan view of the real image type finder optical system according to a sixth embodiment of the present invention.

As shown in the plan view of FIG. 7, a sixth embodiment of the present invention is one in which the second prism 24, the plane mirror 27, the eyepiece 25 and the cover glass 26 of the above-described third embodiment is substituted for the second prism 14, the eyepiece lens 5 and the cover glass 6 of the above-described fifth embodiment. Since the function of the sixth embodiment is exactly the same as those of the fifth and third embodiments, description thereto will be omitted.

Seventh Embodiment

Figure 8:
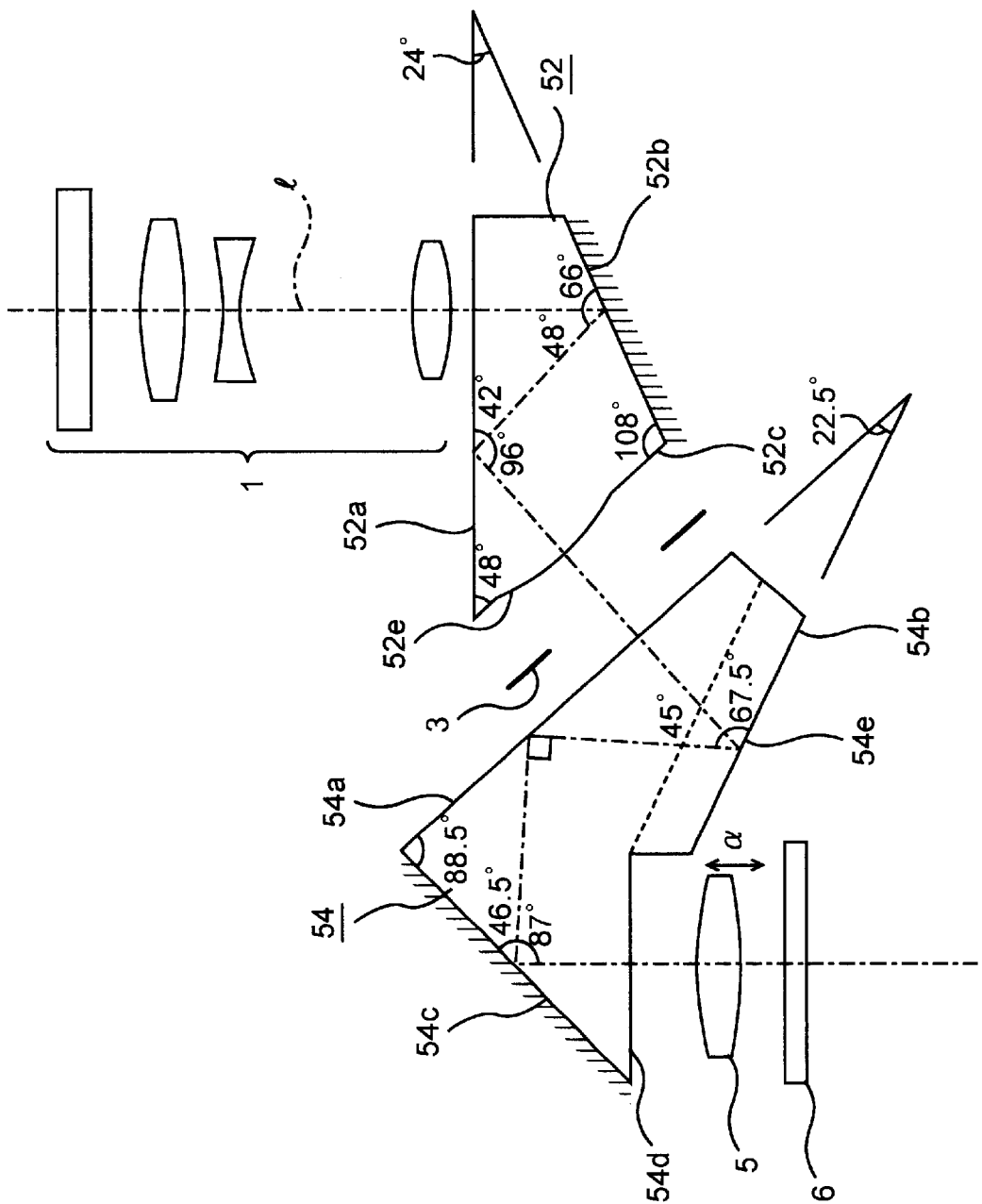
FIG. 8 is a plan view of the real image type finder optical system according to a seventh embodiment of the present invention.

FIG. 8 is a plan view of the real image type finder optical system according to a seventh embodiment of the present invention. The top-to-bottom direction in the figure corresponds to the front-to-back direction of this real image type finder optical system, in other words, the direction connecting an object and a photographer's eye.

As shown in FIG. 8, the real image type finder optical system according to the seventh embodiment comprises, in order from the object side along an optical path, an objective optical system 1, a first prism 52, a field frame 3, a second prism 54, an eyepiece lens 5 and a cover glass 6. An initial optical axis of the objective optical system 1 and an initial optical axis of the eyepiece lens 5 are in parallel with each other. Since the objective optical system 1, the field frame 3, the eyepiece lens 5 and the cover glass 6 are exactly the same as those in the first embodiment described above, description thereto will be omitted.

The first prism 52 has side faces including a first face 52a as an entrance surface, a second face 52b as a reflective surface and a third face 52c as an exit surface. The first face 52a is arranged to confront the objective optical system 1 and to be substantially perpendicular to the finder optical axis 1. The second face 52b is opposed to the first face 52a at an angle of 24°. The third face 52c adjoins the first face 52a at an angle of 48° on the side where the first face 52a and the second face 52b draw apart from each other. This first prism 52 is molded of transparent resin having a refractive index of 1.5. Therefore, the total reflection condition of the first prism 52 for its internal reflection is that a critical angle θ is 41.8° (=sin$^{-1}$ 1/1.5). The first prism 52, being a resinous article, can be obtained at lower costs.

Light beams coming out of the objective optical system 1 enter the first prism 52 through the first face 52a. Then, these light beams are incident on the second face 52b at incident angles of 24° on average. Since the incident angle of 24° does not satisfy the total reflection condition described above, reflective coating of aluminum is applied to this second face 52b. As a result, the light beams incident on the second face 52b are reflected toward the first face 52a and the finder optical axis 1 is bent toward the object side at an angle of 48° within the plane of FIG. 8.

The finder optical axis 1 thus bent makes an angle of 48° with the normal line of the first face 52a. Thus, the light beams reflected by the second face 52b are re-incident on the first face 52a at incident angle of 48° on average. The average incident angle of 48° satisfy the total reflection condition, so that the light beams re-incident on the first face 52a are totally reflected and the finder optical axis 1 is bent toward the third face 52c at an angle of 96° within the plane of the FIG. 8.

In a substantially rectangular area on this third face 52c around the finder optical axis 1 is formed a positive-powered lens surface 52e having its center of curvature on the finder optical axis 1. Therefore, the finder optical axis 1 is substantially perpendicular to the tangent plane of the lens surface 52e at the intersection with the finder optical axis 1. Accordingly, the finder optical axis 1 is not deviated by the third face 52c. This lens surface 52e functions as a condenser lens for providing coincidence between the exit pupil of the objective optical system 1 and the entrance pupil of the eyepiece lens 5.

The second prism 54 has side faces including a first face 54a as an entrance surface, a second face 54b as a reflective face, a third face 54c as a reflective face and a fourth face 54d as an exit surface. The first face 54a is arranged to confront the third face 52c of the first prism 52 via the field frame 3 and to be substantially perpendicular to the finder optical axis 1. The second face 54b is consisted of roof faces comprising a pair of reflective faces which meet each other with a right angle therebetween along a ridge line 54e inclined by 22.5° with respect to the eyepiece-side edge of the first face 54a. The third face 54c adjoins the object-side edge of the first face 54a at an angle of 88.5°. The fourth face 54d adjoins the eyepiece-side edge of the second face 54b at an angle of 45°. This second prism 54 is also molded of transparent resin having a refractive index of 1.5. Therefore, the second prism 54 also has a critical angle θ of 41.8° as the total reflection condition for its internal reflection. The second prism 54, being a resinous article, can be obtained at lower costs.

Since the finder optical axis 1 transmitted through the first face 54a of this second prism 54 inclines by 48° with respect to the initial optical axis of the objective optical system 1, the first face 54a inclines by 40° with respect to the initial optical axis of the objective optical system 1. Light beams entering the second prism 54 through this first face 54a are then incident on the second face 54b. The ridge line 54d of the roof faces constituting the second face 52b of this second prism 54 inclines by 22.5° with respect to the first face 54a, and thus inclines 67.5° with respect to the finder optical axis 1. In addition, each of the reflective faces constituting the roof faces inclines by 45° with respect to the plane including the ridge line 54e and the finder optical axis 1. As a result, the normal line of each reflective face makes an angle of 50.4° with the finder optical axis 1. Accordingly, light beams entering this second prism 54 through the first face 54a are incident on the respective reflective faces of the roof faces constituting the second face 54b at incident angles of 50.4° on average. This average incident angle of 50.4° satisfies the total reflection condition described above, so that the light beams incident on the second face 54b are totally reflected by the roof faces while being inverted upside down, and the finder optical axis 1 is bent toward the object side at an angle of 45° within the plane of FIG. 8.

The finder optical axis 1 bent by the second face 54b makes an angle of 45° with the normal line of the first face 54a. Therefore, the light beams are incident on this first face 54a at incident angles of 45° on average. Here, the off axial rays entering the second prism 54 are made to be substantially telecentric beams by the lens surface 52e of the first prism 52. The eyepiece lens 5 functions like as an entrance-side telecentric optical system, since its exit pupil is positioned near the rear focus thereof. This provides the off axial rays entering the second prism 54 with small incident angles on the order of +/−5° in the air, which corresponds to an angle of +/−3.3° in the prism 54 having a refractive index of 1.5. Therefore, even marginal rays are incident on the first face 54a at an incident angle of 41.7°, so that the total reflection condition is almost satisfied. As a result, the light beams re-incident on this first face 54a are totally reflected toward the third face 54c, and the finder optical axis 1 is bent at an angle of 90°. Since the finder optical axis 1 bent by this first face 54a makes an angle of 43.5° with the normal line of the third face 54c, the light beams are incident on this third face 54c at incident angles of 43.5° on average, which dose not satisfy the total reflection condition. Hence, reflective coating of aluminum is applied to this third face 54c. The finder optical axis 1 is bent by the third face 54c toward the eyepiece side at an angle of 87° so as to be parallel to the initial optical axis of the objective optical system 1. Since the finder optical axis 1 bent by this third face 54c makes approximately 90° with the fourth face 54d, the light beams incident on this fourth face 54d are transmitted through the fourth face 54d.

Eighth Embodiment

In comparison with the seventh embodiment described above, a eighth embodiment of the present invention has a construction in which the function of the lens surface 52e of the first prism 52 is replaced with a condenser lens 13, in which the second face 54b of the second prism 54 is formed as a plane surface, and in which the third face 54c of the second prism 54 is formed as roof faces.

Figure 9:
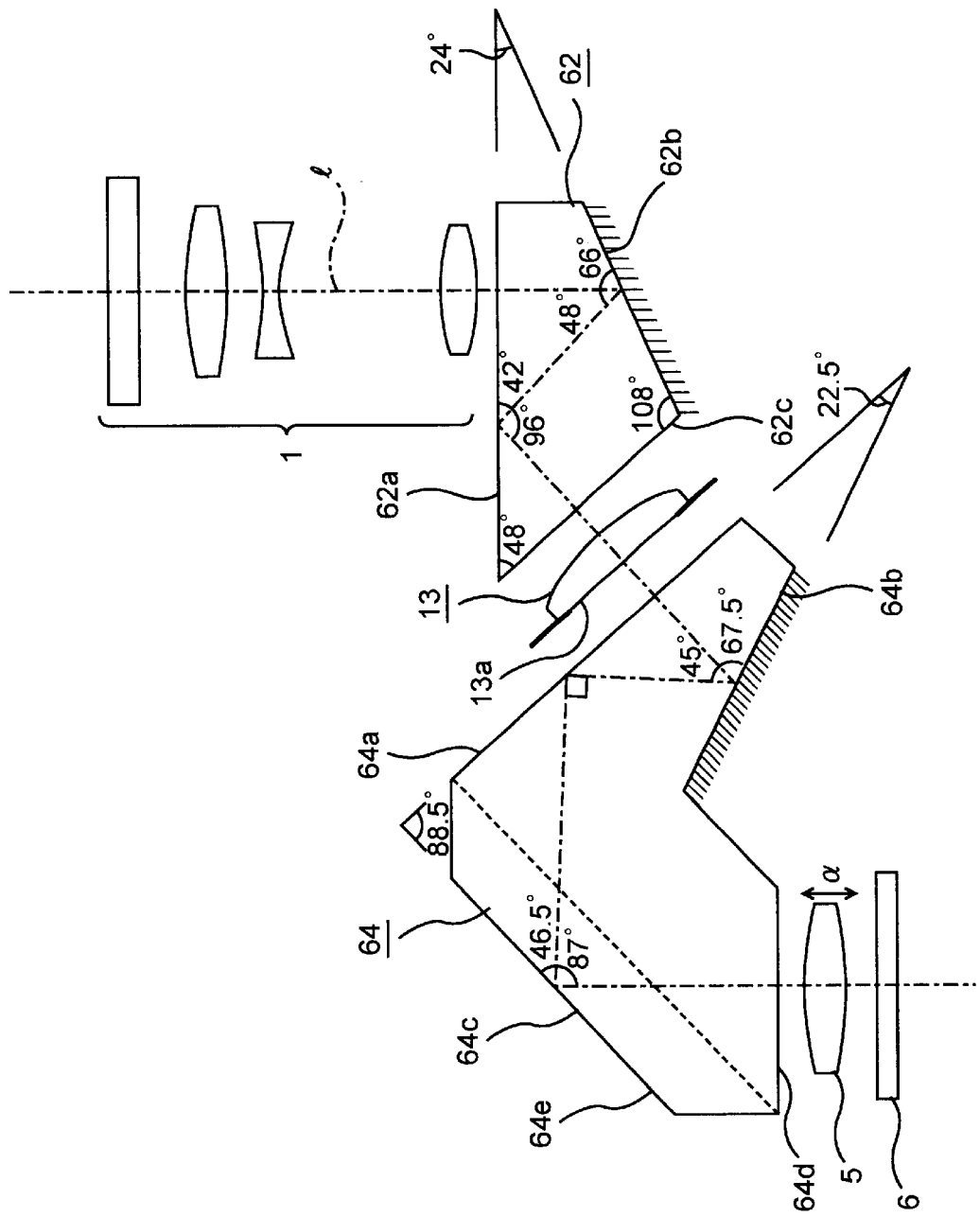
FIG. 9 is a plan view of the real image type finder optical system according to a eighth embodiment of the present invention.

FIG. 9 is a plan view of the real image type finder optical system according to the eighth embodiment of the present invention. The top-to-bottom direction in the figure corresponds to the front-to-back direction of this real image type finder optical system, in other words, the direction connecting an object and a photographer's eye.

As shown in this FIG. 9, the real image type finder optical system according to the eighth embodiment comprises, in order from the object side along the finder optical axis 1, an objective optical system 1, a first prism 62, a condenser lens 13, a second prism 64, the eyepiece lens 5 and a cover glass 6. Since the objective optical system 1, the eyepiece lens 5 and the cover glass 6 are exactly the same as those in the first embodiment described above, description thereto will be omitted. Besides, since the condenser lens 13 is exactly the same as that in the second embodiment described above, description thereto will be omitted. Additionally, since the first prism 62 exactly the same as that in the seventh embodiment described above, except for its third face 62c being a plane surface perpendicular to the finder optical axis 1, description thereto will be omitted.

The second prism 64 has side faces including a first face 64a as the entrance surface, a second face 64b as a reflective face, a third face 64c as a reflective face and a fourth face 64d as the exit surface. The first face 64a is arranged to confront the third face 62c of the first prism 62 via the condenser lens 13 and to be substantially perpendicular to the finder optical axis 1. The second face 64b is opposed to the first face 64a at an angle of 22.5° to bend the finder optical axis 1 transmitted through the first face 64a toward the object side at an angle of 45°. The third face 64c is consisted of roof faces comprising a pair of reflective faces which meet each other with a right angle therebetween along a ridge line 64e inclined by 88.5° with respect to the eyepiece-side edge of the first face 64a. The fourth face 64d is inclined by 43.5° with respect to the ridge line 64e. This second prism 64 is molded of transparent resin having a refractive index of 1.5. Accordingly, the total reflection condition of this second prism 64 for its internal reflection is that a critical angle θ is 41.8°.

The finder optical axis 1 transmitted through the first face 64a of this second prism 64 and the normal line of the second face 64b make therebetween an angle of 22.5°, which does not satisfy the total reflection condition for incident light beams. On that account, reflective coating of aluminum is applied to this second face 64b. The second face 64b bends the finder optical axis 1 toward the object side. The finder optical axis 1 bent by the second face 64b makes an angle of 45° with the normal line of the first face 64a. Therefore, the light beams are incident on this first face 64a at incident angles of 45° on average. Here, the off axial rays entering the second prism 64 are made to be substantially telecentric beams by the condenser lens 13. The eyepiece lens 5 functions like as an entrance-side telecentric system, since its exit pupil is positioned near the rear focus thereof. This provides the off axial rays entering the second prism 64 with small incident angles on the order of +/−5° in the air, which corresponds to an angle of +/−3.3° in the prism 64 having a refractive index of 1.5. Therefore, even marginal rays are incident on the first face 64a at an incident angle of 41.7°, so that the total reflection condition is almost satisfied. As a result, the light beams re-incident on this first face 64a are totally reflected toward the third face 64c, and the finder optical axis 1 is bent by this first face 64a in the direction substantially perpendicular to the initial optical axis of the objective optical system 1. The light beams reflected by the first face 64a then enter the third face 64c. The ridge line 64e between the roof faces constituting the third face 64c is inclined by 88.5° with respect to the first face 64a, and therefore inclines 46.5° with respect to the finder optical axis 1. In addition, each reflective face of the roof faces is inclined by 45° with respect to the plane including the ridge line 64e and the finder optical axis 1. As a result, the normal line of each reflective face and the finder optical axis 1 form an angle of 59.1°. This means that the light beams reflected by the first face 64a are incident on each reflective face of the roof faces constituting the third face 64c at incident angles of 59.1° on average. This average incident angle of 59.1° satisfies the total reflection condition described above. Therefore, the light beams incident on the third face 64c are totally reflected by the roof faces while being inverted upside down, and the finder optical axis 1 is bent toward the object side at an angle of 87° within the plane of FIG. 9, so as to be parallel with the initial optical axis of the objective optical system 1. Since the finder optical axis 1 bent by this third face 64c makes an angle of approximately 90° with the fourth face 64d, the light beams incident on the fourth face 64d are transmitted through this fourth face 64d.

Ninth Embodiment

In comparison with the fifth embodiment described above, a ninth embodiment of the present invention has a construction in which the third face 42c of the first prism 42 is formed as a plane surface, and in which the second face 14c of the second prism 14 is formed as roof faces.

Figure 10:
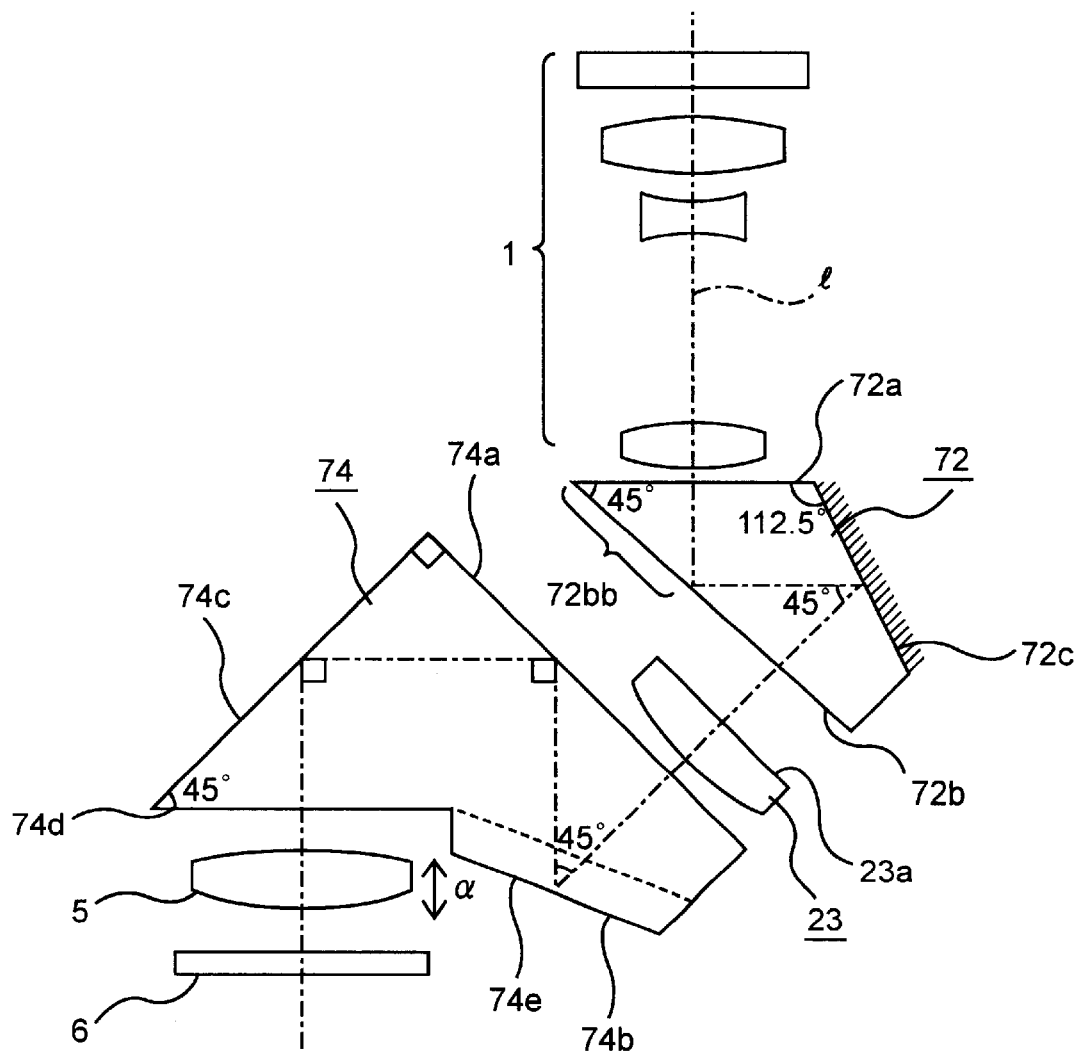
FIG. 10 is a plan view of the real image type finder optical system according to a ninth embodiment of the present invention.

FIG. 10 is a plan view of the real image type finder optical system according to the ninth embodiment of the present invention. The top-to-bottom direction in the figure corresponds to the front-to-back direction of this real image type finder optical system, in other words, the direction connecting an object and a photographer's eye.

As shown in FIG. 10, the real image type finder optical system according to the ninth embodiment comprises, in order from the object side along the finder optical axis 1, an objective optical system 1, the first prism 72, a condenser lens 23, a second prism 74, an eyepiece lens 5 and a cover glass 6. Since the objective optical system 1, the condenser lens 23, the eyepiece lens 5 and the cover glass 6 are exactly the same as those in the fifth embodiment described above, description thereto will be omitted.

The first prism 72 has side faces including first through third faces 72a–72c. The first face 72a confronts the exit plane of the objective optical system 1 and is substantially perpendicular to the finder optical axis 1. The second face 72b adjoins the first face 72a at an angle of 45°. The third face 42c adjoins the second face 72b at the angle of 22.5°. This first prism 72 is molded of transparent resin having a refractive index of 1.5. Thus, the total reflection condition of this first prism 72 for its internal reflection is that a critical angle θ is 41.8°. Since the normal line of the second face 72b of the first prism 72 and the finder optical axis 1 make an angle of 45°, the finder optical axis 1 is bent 90° laterally. Among the light beams coming out of the non-telecentric type objective optical system 1 to enter the first prism 72 through the first face 72a, some of those incident on a region 72bb of the second face 72b nearer to the objective optical system 1 than the intersection with the optical axis 1 do not satisfy the total reflection condition with respect to the second face 72b. On that account, reflective coating of aluminum is applied to the region 72bb. The light beams reflected by the third face 72c are not incident on this region, therefore, no light beams will be intercepted by this reflective coating.

Light beams reflected by the second face 72b are incident on the third face 72c at incident angles of 25.5° on average. Since the average incident angle of 25.5° does not satisfy the total reflection condition described above, reflective coating of aluminum is applied to this third face 72c. As a result, the light beams incident on the third face 72c are reflected and the finder optical axis 1 is bent toward the eyepiece side at an angle of 45° within the plane of FIG. 10. The finder optical axis 1 bent by this third face 72c makes approximately 90° with the second face 72b, so that the light beams re-incident on the second face 72b from the third face 72c are transmitted through this second face 72b.

The second prism 74 has side faces including a first face 74a as an entrance surface, a second face 74b as a reflective face, a third face 74c as a reflective face and a fourth face 74d as an exit surface. The first face 74a is arranged to confront the second face 72b of the first prism 72 via the condenser lens 23 and to be substantially perpendicular to the finder optical axis 1. The second face 74b is consisted of roof faces comprising a pair of reflective faces which meet each other with a right angle therebetween along a ridge line 74e inclined by 22.5° with respect to the eyepiece-side edge of the first face 74a. The third face 74c adjoins the object-side edge of the first face 74a at an angle of 90°. The fourth face 74d adjoins the eyepiece-side edge of the third face 74c at an angle of 45°. This second prism 74 is also molded of transparent resin having a refractive index of 1.5. Therefore, the second prism 74 also has a critical angle θ of 41.8° as the total reflection condition for its internal reflection. The second prism 74, being a resinous article, can be obtained at lower costs.

Since the finder optical axis 1 transmitted through the first face 74a of this second prism 74 inclines 45° with respect to the initial optical axis of the objective optical system 1, the first face 74a inclines by 45° with respect to the initial optical axis of the objective optical system 1. Light beams entering the second prism 74 through this first face 74a are then incident on the second face 74b. The ridge line 74d of the roof faces constituting the second face 72b of this second prism 74 inclines by 22.5° with respect to the first face 74a, and thus inclines 67.5° with respect to the finder optical axis 1. In addition, each of the reflective faces constituting the roof faces inclines by 45° with respect to the plane including the ridge line 74e and the finder optical axis 1. As a result, the normal line of each reflective face makes an angle of 50.4° with the finder optical axis 1. Accordingly, light beams entering this second prism 74 through the first face 74a are incident on the respective reflective faces of the roof faces constituting the second face 74b at incident angles of 50.4° on average. This average incident angle of 50.4° satisfies the total reflection condition described above, so that the light beams incident on the second face 54b are totally reflected by the roof faces while being inverted upside down, and the finder optical axis 1 is bent toward the object side at an angle of 45° within the plane of FIG. 10.

The finder optical axis 1 bent by the second face 74b makes an angle of 45° with the normal line of the first face 74a. Therefore, the light beams are incident on this first face 74a at incident angles of 45° on average. Here, the off axial rays entering the second prism 74 are made to be substantially telecentric beams by the condenser lens 23. The eyepiece lens 5 functions like as an entrance-side telecentric optical system, since its exit pupil is positioned near the rear focus thereof. This provides the off axial rays entering the second prism 74 with small incident angles on the order of +/−5° in the air, which corresponds to an angle of +/−3.3° in the prism 74 having a refractive index of 1.5. Therefore, even marginal rays are incident on the first face 74a at an incident angle of 41.7°, so that the total reflection condition is almost satisfied. As a result, the light beams re-incident on this first face 74a are totally reflected toward the third face 74c, and the finder optical axis 1 is bent at an angle of 90°. Since the finder optical axis 1 bent by this first face 74a makes an angle of 45° with the normal line of the third face 74c, the light beams are incident on this third face 74c at incident angles of 45° on average, which satisfies the total reflection condition. Hence, the light beams incident on this third face 74c are totally reflected toward the fourth face 74d, and the finder optical axis 1 is bent by the third face 74c toward the eyepiece side at an angle of 90° so as to be parallel to the initial optical axis of the objective optical system 1. Since the finder optical axis 1 bent by this third face 74c makes approximately 90° with the fourth face 74d, the light beams incident on this fourth face 74d are transmitted through the fourth face 74d.

Tenth Embodiment

In comparison with the ninth embodiment described above, a tenth embodiment of the present invention has a construction in which the second face 74b of the second prism 74 is formed as a plane surface, and in which the third face 74c is formed as roof faces.

Figure 11:
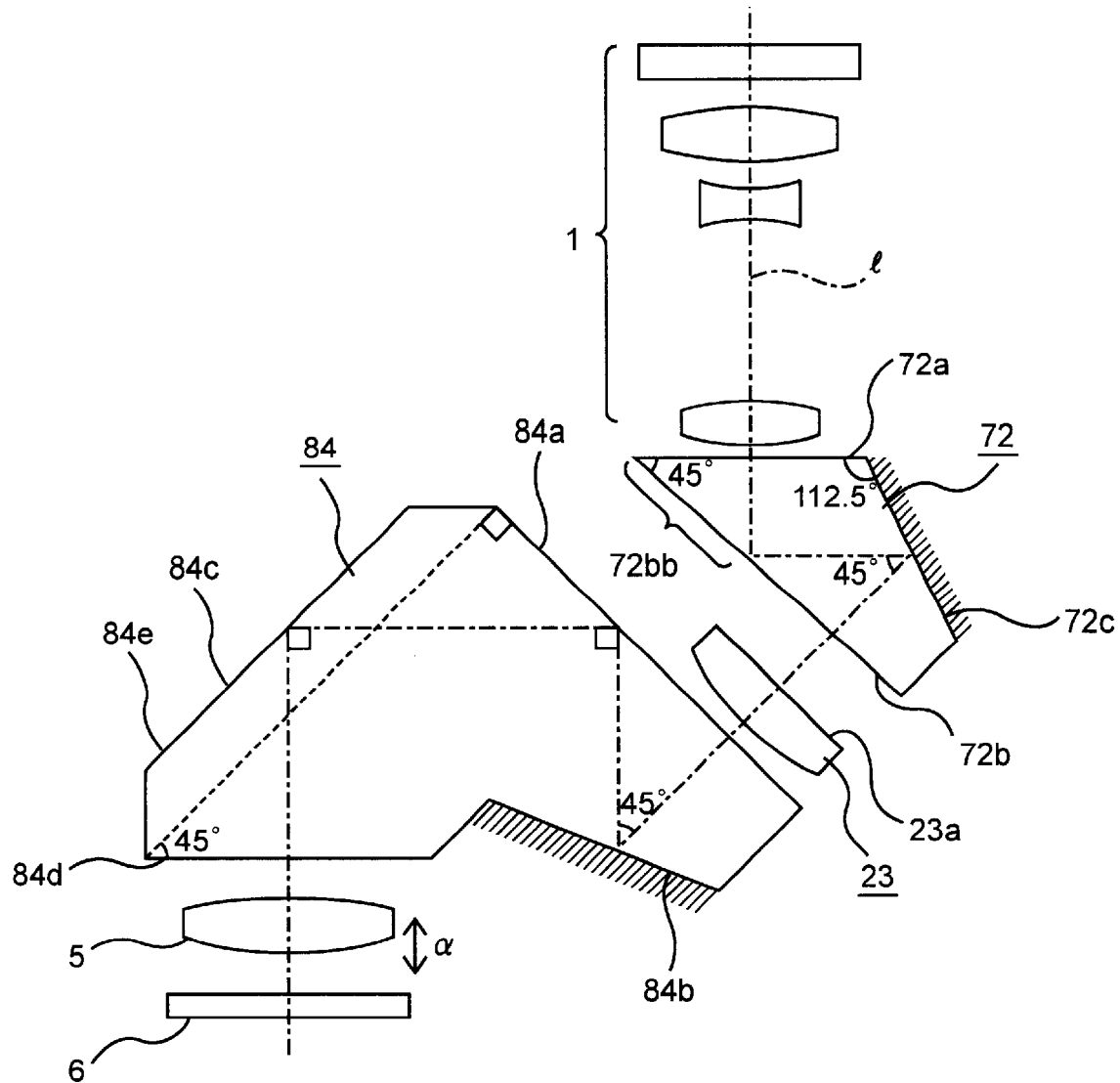
FIG. 11 is a plan view of the real image type finder optical system according to a tenth embodiment of the present invention.
Figure 12:
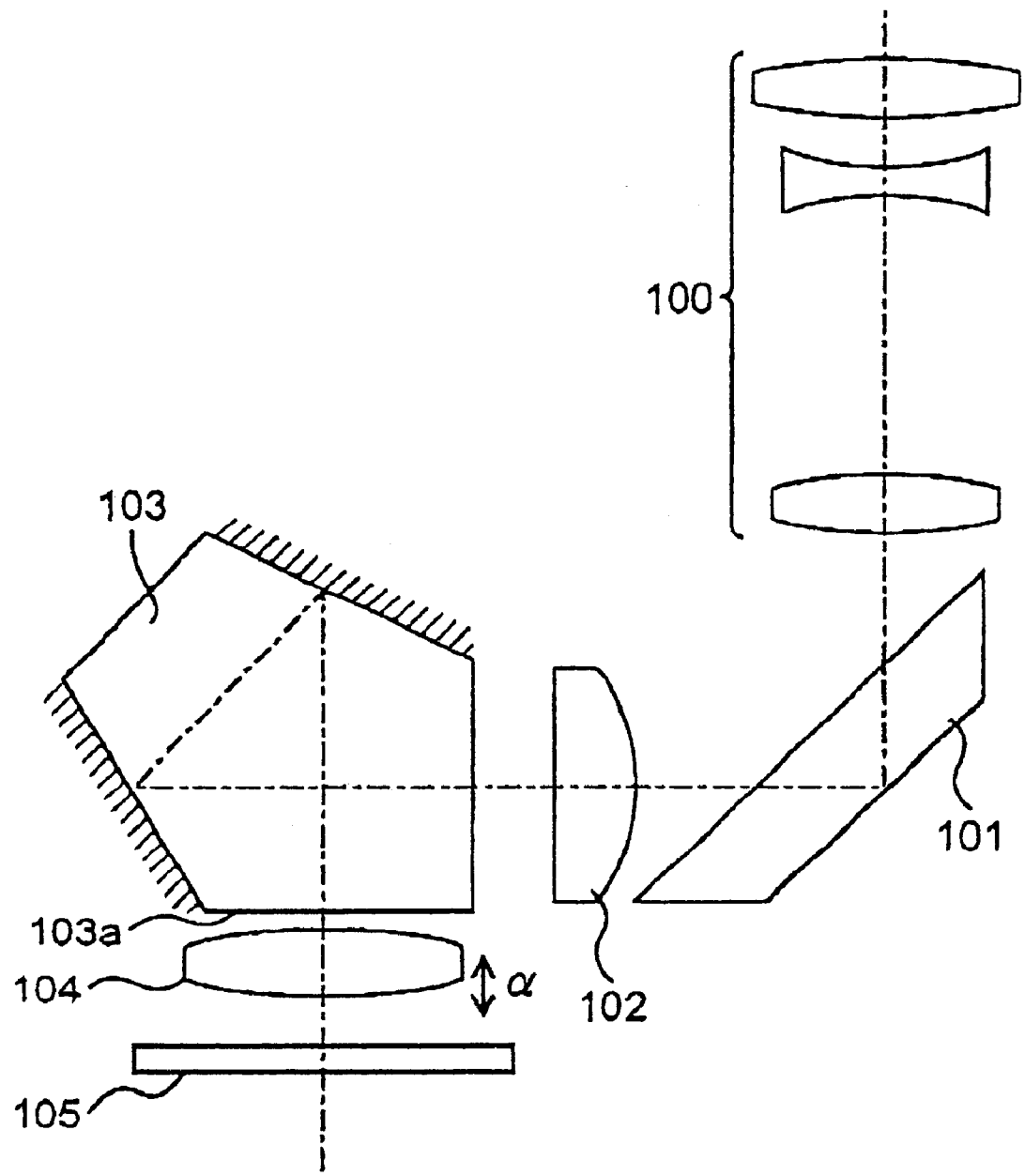
FIG. 12 is a plan view of a conventional, real image type finder optical system.

FIG. 11 is a plan view of the real image type finder optical system according to the tenth embodiment of the present invention. The top-to-bottom direction in the figure corresponds to the front-to-back direction of this real image type finder optical system, in other words, the direction connecting an object and a photographer's eye.

As shown in FIG. 11, the real image type finder optical system according to the tenth embodiment comprises, in order from the object side along the finder optical axis 1, an objective optical system 1, the first prism 72, a condenser lens 23, a second prism 84, an eyepiece lens 5 and a cover glass 6. Since the objective optical system 1, the first prism 72, the condenser lens 23, the eyepiece lens 5 and the cover glass 6 are exactly the same as those in the ninth embodiment described above, description thereto will be omitted.

The second prism 84 has side faces including a first face 84a as the entrance surface, a second face 84b as a reflective face, a third face 84c as a reflective face and a fourth face 84d as the exit surface. The first face 84a is arranged to confront the second face 72b of the first prism 72 via the condenser lens 23 and to be substantially perpendicular to the finder optical axis 1. The second face 84b is opposed to the first face 84a at an angle of 22.5° to bend the finder optical axis 1 transmitted through the first face 84a toward the object side at an angle of 45°. The third face 84c is consisted of roof faces comprising a pair of reflective faces which meet each other with a right angle therebetween along a ridge line 84e inclined by 90° with respect to the object-side edge of the first face 84a. The fourth face 84d is inclined by 45° with respect to the ridge line 84e. This second prism 84 is molded of transparent resin having a refractive index of 1.5. Accordingly, the total reflection condition of this second prism 84 for its internal reflection is that a critical angle θ is 41.8°.

The finder optical axis 1 transmitted through the first face 84a of this second prism 84 and the normal line of the second face 84b make therebetween an angle of 22.5°, which does not satisfy the total reflection condition for incident light beams. On that account, reflective coating of aluminum is applied to this second face 84b. The second face 84b bends the finder optical axis 1 toward the object side. The finder optical axis 1 bent by the second face 84b makes an angle of 45° with the normal line of the first face 84a. Therefore, the light beams are incident on this first face 84a at incident angles of 45° on average. Here, the off axial rays entering the second prism 84 are made to be substantially telecentric beams by the condenser lens 23. The eyepiece lens 5 functions like as an entrance-side telecentric system, since its exit pupil is positioned near the rear focus thereof. This provides the off axial rays entering the second prism 84 with small incident angles on the order of +/−5° in the air, which corresponds to an angle of +/−3.3° in the prism 84 having a refractive index of 1.5. Therefore, even marginal rays are incident on the first face 84a at an incident angle of 41.7°, so that the total reflection condition is almost satisfied. As a result, the light beams re-incident on this first face 84a are totally reflected toward the third face 84c, and the finder optical axis 1 is bent by this first face 84a in the direction substantially perpendicular to the initial optical axis of the objective optical system 1. The light beams reflected by the first face 84a then enter the third face 84c. The ridge line 84e between the roof faces constituting the third face 84c is inclined by 90° with respect to the first face 84a, and therefore inclines 45° with respect to the finder optical axis 1. In addition, each reflective face of the roof faces is inclined by 45° with respect to the plane including the ridge line 84e and the finder optical axis 1. As a result, the normal line of each reflective face and the finder optical axis 1 form an angle of 60°. This means that the light beams reflected by the first face 84a are incident on each reflective face of the roof faces constituting the third face 84c at incident angles of 60° on average. This average incident angle of 60° satisfies the total reflection condition described above. Therefore, the light beams incident on the third face 84c are totally reflected by the roof faces while being inverted upside down, and the finder optical axis 1 is bent toward the object side at an angle of 90° within the plane of FIG. 11, so as to be parallel with the initial optical axis of the objective optical system 1. Since the finder optical axis 1 bent by this third face 84c makes an angle of approximately 90° with the fourth face 84d, the light beams incident on the fourth face 84d are transmitted through this fourth face 84d.

In a real image type finder optical system according to the present invention constituted as described above, the moving range of the eyepiece lens overlaps with the optical path extending from the objective optical system to the fore-end of the moving range of the eyepiece lens in the front-to-back direction. Accordingly, the system can be constituted smaller in overall length along the front-to-back direction.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A real image type finder optical system having an objective optical system and an eyepiece lens arranged so that their optical axes are parallel to each other, in which a light beam having an optical axis extending from said objective optical system to said eyepiece lens is bent at least two times in parallel with a prescribed plane, comprising:

a first prism having a first face serving as an entrance surface for the light beam transmitted along the optical axis of said objective optical system, a second face for bending the light beam laterally and a third face inclined with respect to the first face in order to bend the light beam bent by the second face so that the optical axis of the light beam extends along a direction substantially perpendicular to the second face, the second face having a reflective coating;

a second prism having a first face serving as an entrance surface for transmitting the light beam transmitted through said first prism, a second face having a slope opposed to a slope of the first face in order to obliquely bend the light beam towards an object side and toward the first face, and a third face serving as an exit surface for transmitting the light beam bent in order by the second face and by the first face; and a reflecting member having a reflective surface for bending the light beam transmitted through said second prism so that the optical axis of the light beam is substantially coaxial with the optical axis of said eyepiece lens, wherein a direction of the optical axis of the light beam transmitted through the third face of said second prism is substantially perpendicular to the direction of the optical axis of the light beam transmitted through the first face of said first prism; and wherein said reflecting member and said eyepiece lens are movable as a unit along the direction of the optical axis of the light beam transmitted through the third face of said second prism.

2. The real image type finder optical system according to claim 1, wherein the third face of said first prism is formed as roof faces comprising a pair of reflective faces meeting each other with a right angle therebetween along a ridge line parallel to said prescribed plane.

3. The real image-type finder optical system according to claim 1, said reflective coating being located on a predetermined portion of an area of the second face of the first prism.

4. The real image-type finder optical system according to claim 3, said predetermined portion being positioned closer to the objective optical system than a point at which the light beam is bent by the second face of the first prism.

5. A real image type finder optical system having an objective optical system and an eyepiece lens arranged so that their optical axes are parallel to each other, in which a light beam having an optical axis extending from said objective optical system to said eyepiece lens is bent at least two times in parallel with a prescribed plane, comprising:

a first prism having a first face serving as an entrance surface for the light beam transmitted along an optical axis of said objective optical system, a second face for bending the light beam laterally, and a third face inclined with respect to the first face in order to bend the light beam bent by the second face so that the optical axis of the light beam extends along a direction substantially perpendicular to the second face;

a second prism having a first face serving as an entrance surface for transmitting the light beam transmitted through said first prism, a second face having a slope opposed to a slope of the first face in order to obliquely bend the light beam towards an object side and toward the first face, and a third face serving as an exit surface for transmitting the light beam bent by the second face and by the first face; and a reflecting member having a reflecting surface for bending the light beam transmitted through the second prism so that the optical axis of the light beam is substantially coaxial with the optical axis of the eyepiece lens;

wherein said reflecting member and said eyepiece lens are movable as a unit along the direction of the light beam transmitted through the third face of said second prism.

* * * * *